United States Patent
Li

(10) Patent No.: US 10,380,383 B2
(45) Date of Patent: Aug. 13, 2019

(54) SCREEN PROTECTION FILTER

(71) Applicant: Right Group Central Co., Ltd., New Taipei (TW)

(72) Inventor: Chuan-En Li, Yilan County (TW)

(73) Assignee: RIGHT GROUP CENTRAL CO., LTD., New Taipei (TW)

(*) Notice: Subject to any disclaimer, the term of this patent is extended or adjusted under 35 U.S.C. 154(b) by 0 days.

(21) Appl. No.: 15/996,123

(22) Filed: Jun. 1, 2018

(65) Prior Publication Data

US 2018/0276418 A1    Sep. 27, 2018

Related U.S. Application Data

(63) Continuation-in-part of application No. 15/834,324, filed on Dec. 7, 2017, and a continuation-in-part of application No. 29/626,502, filed on Nov. 17, 2017, now Pat. No. Des. 836,644.

(30) Foreign Application Priority Data

Dec. 9, 2016  (CN) ...................... 2016 2 1349356 U
Mar. 21, 2017  (EP) ................................... 003812981

(51) Int. Cl.
| | | |
|---|---|---|
| *G06F 21/84* | (2013.01) | |
| *G02B 7/00* | (2006.01) | |
| *G02B 5/20* | (2006.01) | |
| *G06F 21/62* | (2013.01) | |

(52) U.S. Cl.
CPC .............. *G06F 21/84* (2013.01); *G02B 5/203* (2013.01); *G02B 7/006* (2013.01); *G06F 21/6245* (2013.01); *G02B 2207/123* (2013.01)

(58) Field of Classification Search
CPC .......... G06F 21/84; G02B 5/203; G02B 7/00; G02B 1/11; H01F 7/0205
USPC ....................... 359/566–567, 613, 601–612; 345/156–157
See application file for complete search history.

(56) References Cited

U.S. PATENT DOCUMENTS

| | | |
|---|---|---|
| 4,852,284 A | 8/1989 | Faggiano |
| 8,537,531 B2 | 9/2013 | Gotham et al. |
| 9,444,508 B2 | 3/2016 | Lee |

(Continued)

FOREIGN PATENT DOCUMENTS

| | | |
|---|---|---|
| CN | 103488253 | 1/2014 |
| CN | 203786738 | 8/2014 |

(Continued)

*Primary Examiner* — Kristina M Deherrera

(57) ABSTRACT

A screen protection filter includes a protection filter body and an attracting member. The protection filter body includes an attraction area and a protection area. The attracting member is disposed at the attraction area of the protection filter body and comprises at least one attracting block. With the attracting member, the protection filter body is attachable to an attraction component of an electronic device, such that the protection area of the protection filter body correspondingly covers over a display screen of the electronic device to prevent nearby persons from spying display contents and keep privacy. By simply attaching the attracting member to the attraction component and removing therefrom, the screen protection filter can be easily attached to and removed from the display screen of the electronic device whenever needed.

34 Claims, 28 Drawing Sheets

(56) References Cited

U.S. PATENT DOCUMENTS

| | | |
|---|---|---|
| 9,829,669 B1 | 11/2017 | Leipold |
| 2005/0274060 A1 | 12/2005 | Lederle et al. |
| 2013/0100055 A1 | 4/2013 | Lauder et al. |
| 2013/0156999 A1* | 6/2013 | Braesch ............ B29C 63/02 428/99 |
| 2013/0220841 A1 | 8/2013 | Yang |
| 2013/0329173 A1 | 12/2013 | Jung et al. |
| 2014/0151248 A1 | 6/2014 | Hurst et al. |
| 2014/0226093 A1 | 8/2014 | Schwartz et al. |
| 2014/0262847 A1 | 9/2014 | Yang |
| 2015/0004382 A1 | 1/2015 | Menon et al. |
| 2015/0043084 A1 | 2/2015 | Snyder et al. |
| 2015/0062126 A1 | 3/2015 | Lee et al. |
| 2015/0207907 A1 | 7/2015 | Eisele et al. |
| 2015/0326266 A1 | 11/2015 | Sumpter |
| 2016/0011441 A1 | 1/2016 | Schwartz et al. |
| 2016/0026321 A1 | 1/2016 | Yeo et al. |
| 2016/0087670 A1 | 3/2016 | Lee |
| 2016/0234356 A1 | 8/2016 | Thomas et al. |
| 2017/0092229 A1* | 3/2017 | Greenebaum ............ G09G 5/10 |
| 2017/0105118 A1 | 4/2017 | Lee |

FOREIGN PATENT DOCUMENTS

| | | |
|---|---|---|
| CN | 20142562036 | 9/2014 |
| CN | 104090377 B | 10/2014 |
| CN | 204229291 | 3/2015 |
| CN | 205651721 U | 10/2016 |
| DE | 202017102528 U1 | 5/2017 |
| JP | 2003058066 | 2/2003 |
| JP | 2003131202 | 5/2003 |
| JP | 2005528252 | 9/2005 |
| JP | 3144355 | 8/2008 |
| JP | 2009025621 | 2/2009 |
| JP | 3181526 | 2/2013 |
| JP | 3200365 | 10/2015 |
| WO | 2017193918 | 11/2017 |

* cited by examiner

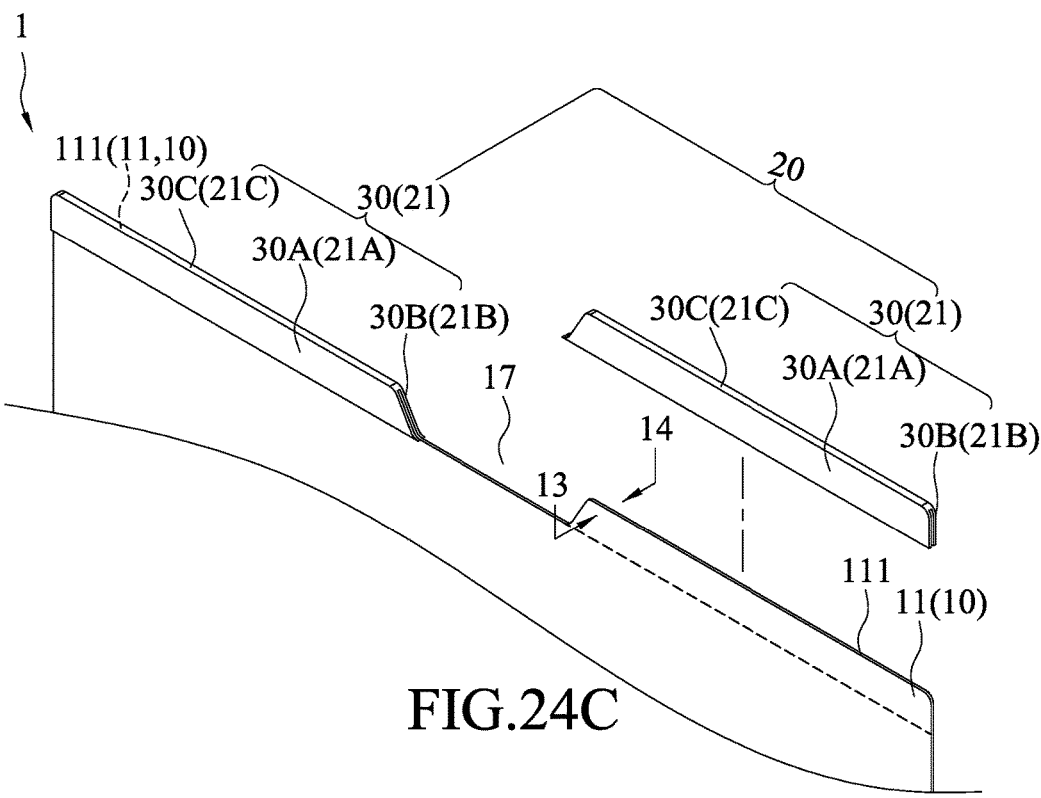
FIG.24C
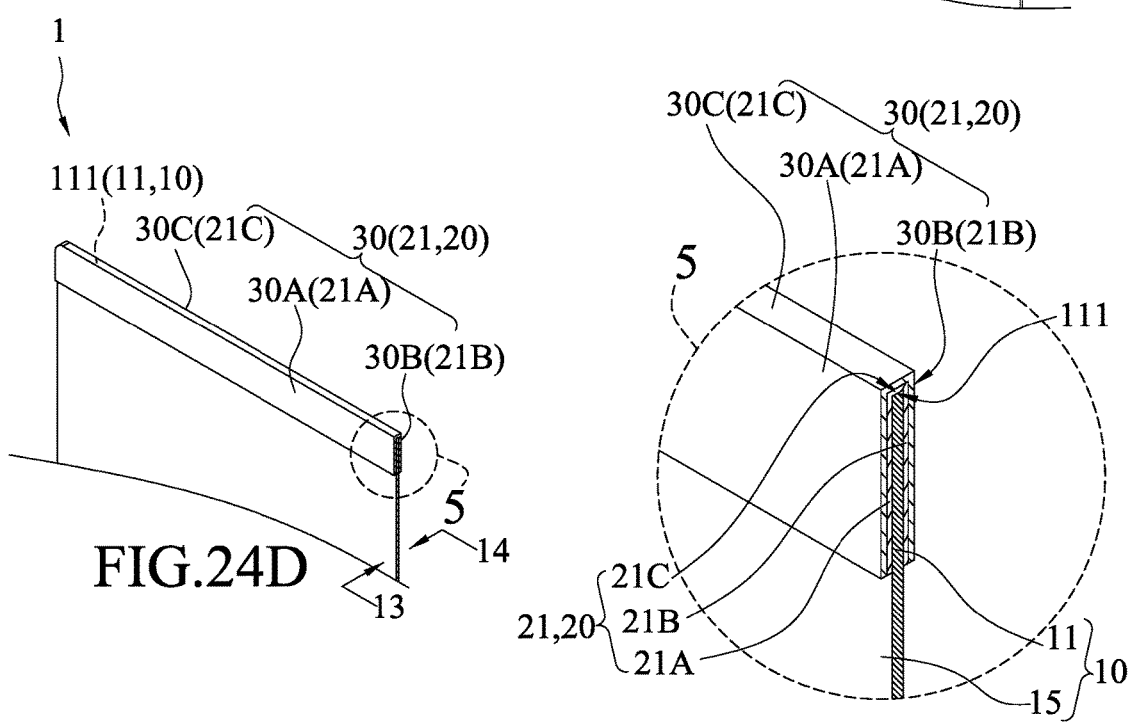
FIG.24D
FIG.24E

SCREEN PROTECTION FILTER

CROSS-REFERENCES TO RELATED APPLICATIONS

This non-provisional application is a Continuation-In-Part application of and claims benefit from U.S. patent application Ser. No. 15/834,324 filed on Dec. 7, 2017, which claims priority under 35 U.S.C. § 119(a) on Patent Application No. 201621349356.7 filed in China on Dec. 9, 2016, the entire contents of which are incorporated herein by reference in its entirety.

This non-provisional application is also a Continuation-In-Part application of and claims benefit from U.S. Design Application No. 29/626,502 filed on Nov. 17, 2017, which claims priority under 35 U.S.C. § 119(a) to Patent Application No. 003812981 filed in European Union, on Mar. 21, 2017, the entire contents of which are hereby incorporated by reference.

BACKGROUND

Technical Field

The instant disclosure relates to a screen protection filter, and particularly relates to an attractive-type screen protection filter.

Related Art

With the advanced progresses of technologies and networks, mobile devices (such as smartphones, tablet computers, notebook computers, etc.) have become indispensable for daily human life. Since mobile devices are very convenient to carry with, people use mobile devices in the offices, in public facilities or on public transportation vehicles.

Generally, mobile devices available in the market mostly do not have the function of preventing the screen from spying. While using in public, nearby persons can easily see the contents displayed on the screen, so user privacy cannot be protected. Accordingly, one solution is to adhere a privacy sheet on the screen of the mobile device to prevent from being easily viewed. However, users find it difficult to remove the privacy sheet adhered on the screen, and the residual glue is even more troublesome. While using in private space, without the concerns of privacy protection temporarily, the privacy sheet adhered on the screen still cannot be easily removed. If the privacy sheet is kept adhered on the screen, it generally causes the brightness of the screen to be darker and the sharpness of the screen to be lower, which will harm the user's eyesight in the long term. Therefore, improvements are necessary.

SUMMARY

Based on the problem mentioned above, an embodiment of the instant disclosure provides a screen protection filter for attaching to attraction component(s) of an electronic device and correspondingly covering a display screen of the electronic device, thereby preventing from spying and keeping privacy.

In embodiments of the application, a screen protection filter comprising a protection filter body and an attracting member is provided. The protection filter body is configured to reduce a viewing angle of light transmitted therethrough. The attracting member comprises a first attracting block, the first attracting block extending along a first lengthwise edge of the protection filter body and having an opening configured to prevent a functional component adjacent to a display screen of an electronic device from being covered by the first attracting block while the screen protection filter is attached to the display screen.

In other embodiments of the application, a screen protection filter comprising a protection filter body, a first attracting block and a shield piece is provided. The protection filter body is configured to reduce a viewing angle of light transmitted therethrough. The first attracting block extends along an entire first edge of the protection filter body. The shield piece is configured to cover an outer portion of the first attracting block to protect an electronic device while the screen protection filter is attached to a display screen of the electronic device.

In yet other embodiments, a screen protection filter comprising a protection filter body, a first attracting block, and a first shield piece is provided. The protection filter body is configured to reduce a viewing angle of light transmitted therethrough. The first attracting block is disposed at a corner of the protection filter body defined by a first edge and a second edge thereof. The first shield piece is disposed at the corner of the protection filter body and configured to cover an outer portion of the first attracting block to protect an electronic device while the screen protection filter is attached to a display screen of the electronic device, wherein the first shield piece extends directly adjacent to side surfaces of the protection filter body at the first and second edges thereof.

In still other embodiments of the application, a screen protection filter comprising a protection filter body, a first attracting block and a second attracting block is provided. The protection filter body is configured to reduce a viewing angle of light transmitted therethrough. The first attracting block and the second attracting block are arranged such that they together extend along an entire first edge of the protection filter body but for a gap left there between, the gap corresponding to a function component of an electronic device adjacent to a display screen while the screen protection filter is attached to the display screen.

The various screen protection filter(s) disclosed in the following embodiments are provided with an attracting member disposed at an attraction area of a protection filter body. In the installing process, the attracting member may be simply aligned with attraction component(s) of an electronic device to rapidly attach the screen protection filter to the electronic device and cover a display screen thereof, thereby preventing nearby persons from spying display contents and keeping privacy. By simply attaching the attracting member to the attraction component and removing therefrom, the screen protection filter can be easily attached to and removed from the display screen of the electronic device whenever needed.

Other aspects and features of the screen protection filters of the application will become apparent to those with ordinary skill in the art upon review of the following description.

BRIEF DESCRIPTION OF THE DRAWINGS

The disclosure will become more fully understood from the detailed description given herein accompanying by the following figures, which are for illustration only, and thus not limitative of the disclosure, wherein:

FIG. 24C is a partial exploded view of a screen protection filter according to another exemplary embodiment of the instant disclosure;

FIG. 24D is a partial sectional view of a screen protection filter according to another exemplary embodiment of the instant disclosure; and FIG. 24E is an enlarged view of circled portion 5 in FIG. 24D.

DETAILED DESCRIPTION

The spirit and scope of the instant disclosure is further introduced by the way of example and in terms of the preferred embodiments as follows.

Figure 1:
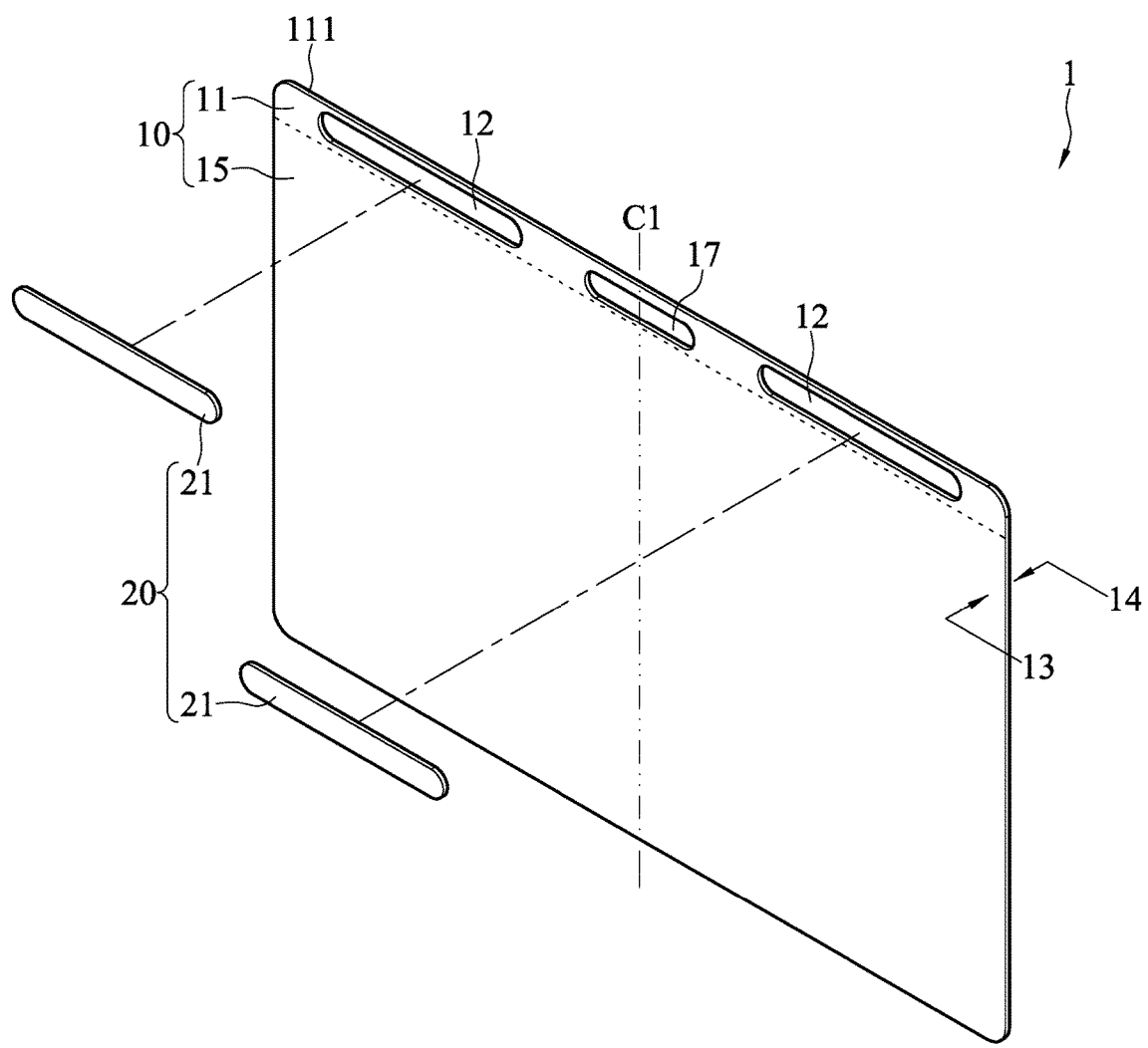
FIG. 1 is an exploded perspective view of a screen protection filter according to a first exemplary embodiment of the instant disclosure.

Please refer to FIG. 1, which illustrates an exploded perspective view of a screen protection filter according to a first exemplary embodiment of the instant disclosure. In the embodiment, a screen protection filter 1 includes a protection filter body 10 and an attracting member 20. The protection filter body 10 includes an attraction area 11 and a protection area 15 defined side-by-side to each other, wherein the attraction area 11 is defined at a lengthwise edge (the top edge in FIG. 1) of the protection filter body 10, adjacent to the top lengthwise side surface 111 of the protection filter body 10, and the protection area 15 includes the rest of the protection filter body 10 other than the attraction area 11. Accommodation hole(s) 12 are defined within the attraction area 11 of the protection filter body 10, and each accommodation hole 12 intercommunicates the front surface 13 and rear surface 14 of the protection filter body 10. In embodiments of the application, attracting member 20 comprises one or more attracting block(s) 21, wherein each attracting block 21 is positioned in the accommodation hole 12 by inserting or adhering the attracting block 21 inside the accommodation hole 12. In an embodiment, outer surfaces of the attracting block(s) 21 are preferably aligned with the front and rear surfaces 13/14 of the protection filter body 10 to be more shipshape; however, the surfaces of the attracting block(s) 21 may be adapted higher or lower than the surface of the protection filter body 10, which is not limited to the embodiment.

Figure 2:
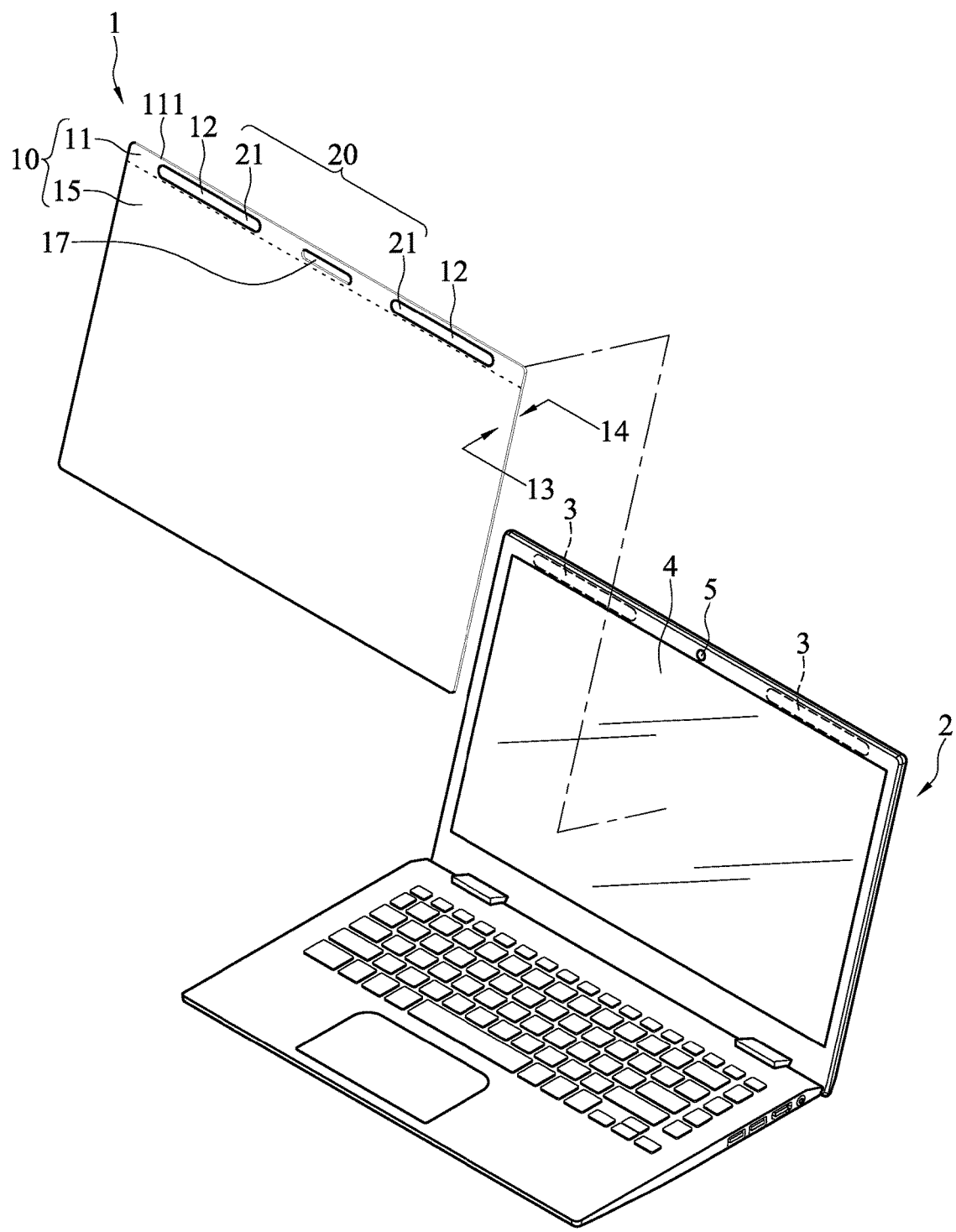
FIG. 2 is an exploded perspective view of a screen protection filter and an electronic device according to another exemplary embodiment of the instant disclosure.

Accordingly, as shown in FIG. 2, by disposing the attracting member 20 at the attraction area 11 of the protection filter body 10, the protection filter body 10 with the attracting member 20 is attachable correspondingly to the attraction components 3 of the electronic device 2. The attracting member 20 and the attraction component 3 may both be magnets (for example Ferrite, alnico or rare-earth magnet) with different magnetic poles, or alternatively one of the attracting member 20 and the attraction component 3 may be a magnet and the other may be a ferromagnetic component (for example Fe, Ni, Co, or any metal components attractable to magnetic force), such that the attracting member 20 and the attraction component 3 may be attracted to each other. In some embodiments, the attraction component(s) 3 of the electronic device 2 may be implemented as a supporting frame fastened to a display panel of the display screen 4 for attaching to a housing of the electronic device 2; alternatively, the attraction component(s) may be an additional part of such supporting frame of the display screen 4. Whether implemented as the supporting frame or the additional part of the supporting frame, the attraction component(s) 3 may be magnets or ferromagnetic components so to be attractable by a magnetic force. In different embodiments, the position of the attraction component 3 varies, such as at the edges and/or the corners in the peripheral surrounding the display panel of the display screen 4, or adjacent to the edge of the display panel yet behind the display panel of the display screen 4. In an embodiment, if the attracting member 20 and the attraction component 3 are magnets with different magnetic poles respectively, the attracting member 20 is attracted by the magnetic force to automatically align with the attraction component 3, thereby automatically positioning the screen protection filter 1 onto a correct position on the display screen 4 of the electronic device 2. In the embodiment, the electronic device 2 is a notebook computer, and the attraction components 3 are configured inside the notebook computer at the top portion of the display screen 4 for the attracting member 20 of the protection filter body 10 to correspondingly attach thereto. When the protection filter body 10 is moved with its attracting member 20 close to the attraction components 3, the magnetic force functions and make the attracting member 20 attach on the attraction components 3. The screen protection filter 1 is consequently positioned on the electronic device 2, with the protection area 15 of the protection filter body 10 correspondingly covering over the display screen 4 of the electronic device 2, thereby preventing nearby persons from spying privacy contents on the display screen 4. In addition, when the user has a need to remove the screen protection filter 1, the user needs only to remove the attracting member 20 from the attraction component of the electronic device 20, thereby achieving the advantages of rapidly attaching and removing. Furthermore, corresponding to a visual sensor 5 (such as a camera with CCD or CMOS components) of the electronic device 2, an opening 17 is defined within the attraction area 11 of the protection filter body 10, thereby preventing the visual sensor 5 from being covered by the protection filter body 10 when the screen protection filter 1 is attached to the electronic device 2. Certainly, if necessary, other openings or holes may be defined on the protection filter body 10 to correspond to any other function components of the electronic device 2 (such as light(s), earphone jack(s) or functional button(s)).

Figure 5:
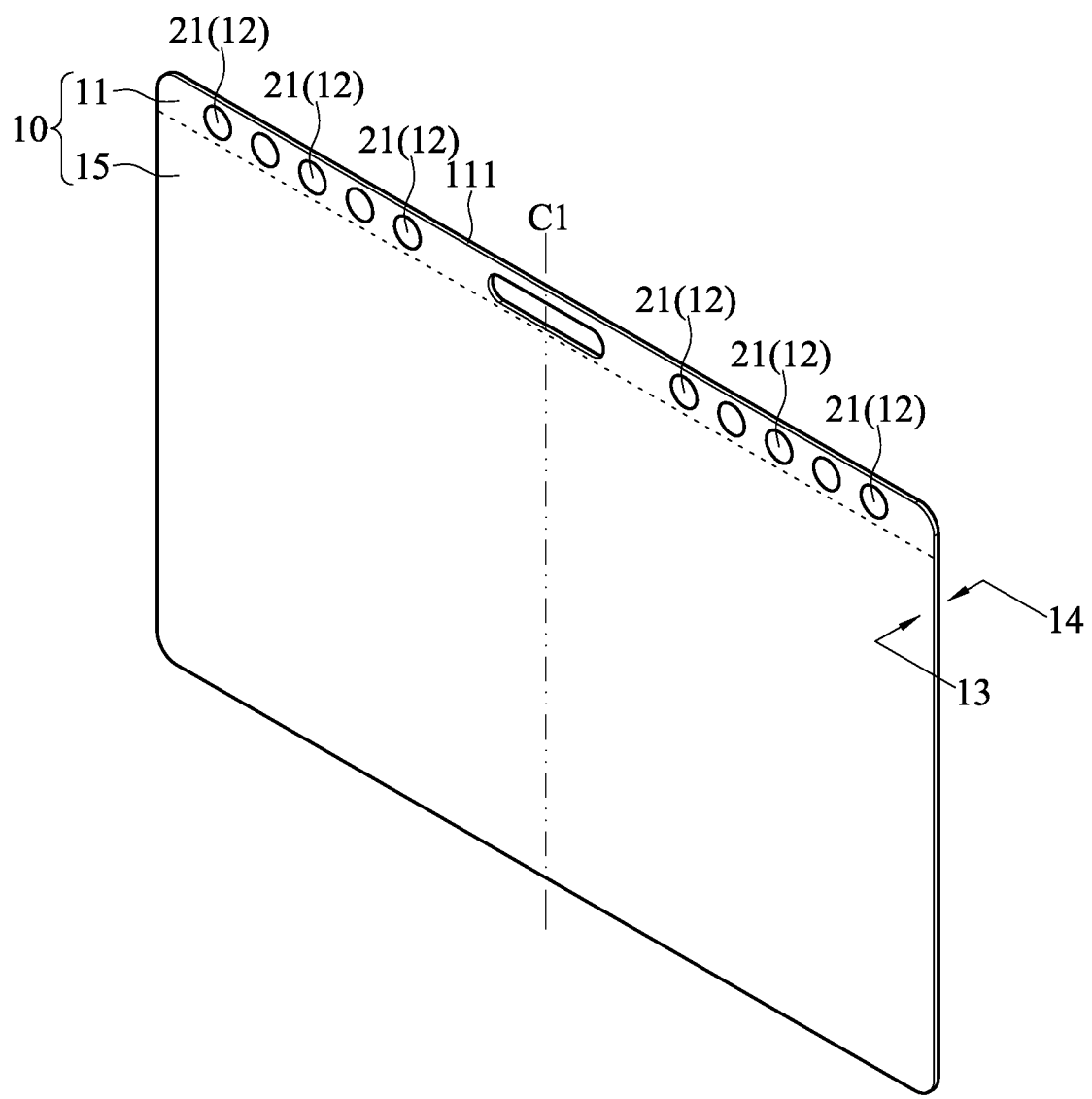
FIG. 5 is a perspective view of a screen protection filter according to a second exemplary embodiment of the instant disclosure.

Moreover, as shown in FIG. 1, in the embodiment, two accommodation holes 12 are defined within the attraction area 11 of the protection filter body 10. Each of the accommodation holes 12 is a long slot. The accommodation holes 12 are defined with symmetry according to a center line C1 of the protection filter body 10. Each of the attracting blocks 21 may be bar-shaped, corresponding to the shape of the accommodation hole 12, to have a greater attracting area. In addition, the attracting blocks 21 respectively positioned in each of the accommodation holes 12 are also positioned with symmetry according to the center line C1 of the protection filter body 10. Therefore, the attraction area 11 of the protection filter body 10 is able to averagely attach to the electronic device 2 and achieve better positioning. In some embodiments, the attraction area 11 of the protection filter body 10 may define only one accommodation hole 12, which is not a limitation to the embodiment. Besides, as shown in FIG. 5, which is a perspective view of a screen protection filter according to a second exemplary embodiment of the instant disclosure, the difference between the second embodiment and the first embodiment is that, multiple attracting blocks 21 (here each attracting blocks 21 is circular or oval) are positioned at the attraction area 11 at both sides of the center line C1 of the protection filter body 10, so as to have multiple attaching points and enhance the positioning effect. It is understood that the attracting block(s) 21 of the attracting member 20 of the application may have a variety of shapes and/or sizes in addition to those shown in the drawings. In addition, differently shaped and/or sized attracting blocks 21 may be used on a given protection filter body 10. Moreover, in embodiments of the application, the attracting block(s) 21 may be arranged on a given protection filter body 10 in locations other than those illustrated in the drawings.

Figure 3:
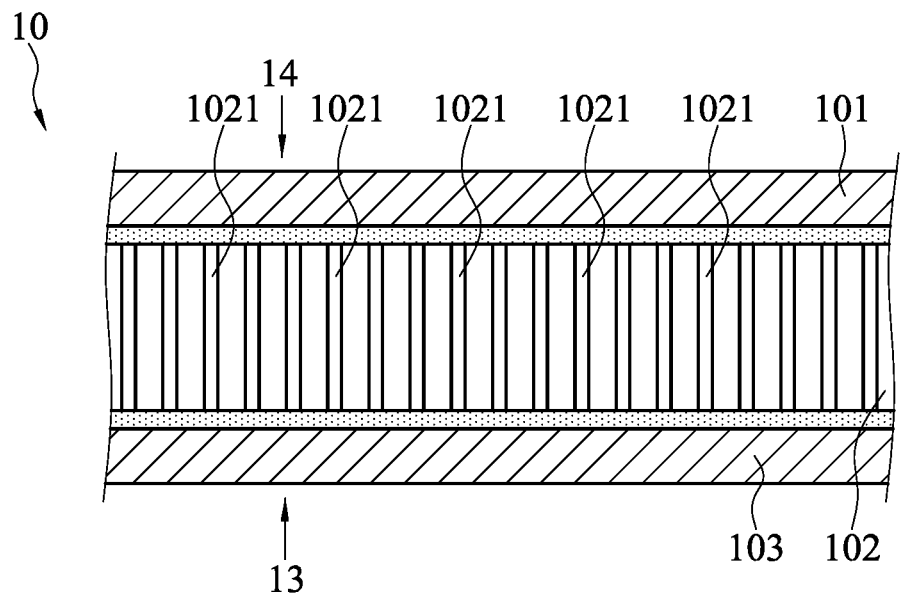
FIG. 3 is a sectional view of a protection filter body according to an exemplary embodiment of the instant disclosure.

Refer to FIG. 3, which is a sectional view of a protection filter body according to an exemplary embodiment of the instant disclosure. The protection filter body 10 includes two outer layers 101, 103 and a grating layer 102; however, in other embodiments of the application, the protection filter body 10 may include only one outer layer 101, or more that two outer layers 101. The outer layers 101, 103 may be highly transparent resin layers. For example, the outer layers 101, 103 may be Polyimide, Polyethylene terephthalate, Polycarbonate or PET. The grating layer 102 is disposed between the two outer layers 101, 103. For example, the outer layers 101, 103 are respectively adhered onto two opposite surfaces of the grating layer 102.

Figure 4:
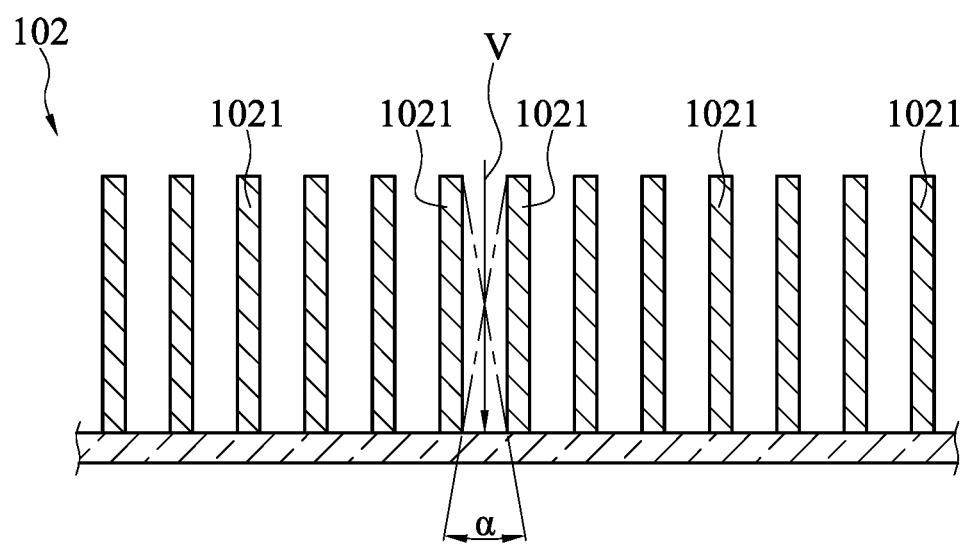
FIG. 4 is a sectional view of a grating layer according to an exemplary embodiment of the instant disclosure.

Refer to FIG. 4, which is a sectional view of a grating layer according to an exemplary embodiment of the instant disclosure. The grating layer 102 includes multiple opaque grating walls 1021 configured according to microlouver principle. The opaque grating walls 1021 of the grating layer 102 are configured in parallel with a constant interval (namely standing louver structures) to limit light passing within a certain angle α. Therefore, only a visual range within the angle α is provided; and the angle shown as Arrow V, vertical to the grating layer 102 (namely zero degree), can have unaffected visibility as most of light is not blocked. If the viewing angle differentiates more from the angle α, the brightness becomes lower, thereby sufficiently preventing nearby persons from spying and keeping privacy.

Figure 6:
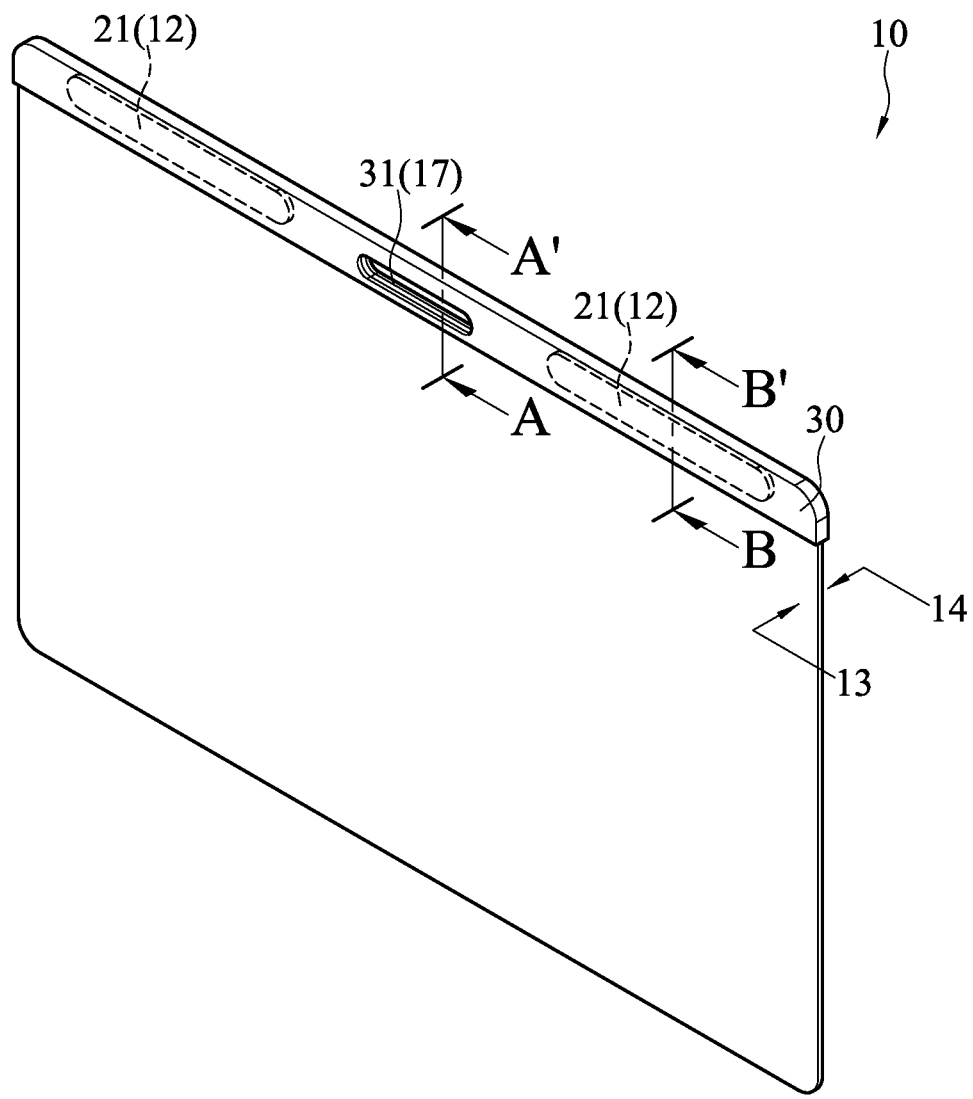
FIG. 6 is a perspective view of a screen protection filter according to a third exemplary embodiment of the instant disclosure.

Refer to FIG. 6, which is a perspective view of a screen protection filter according to a third exemplary embodiment of the instant disclosure. The major difference between the embodiment and the first embodiment is, the protection filter body 10 further includes a shield piece 30 configured at the attraction area 11. For example, the shield piece 30 may be formed by heat compression molding to cover over the attraction area 11, as well as covering over the outer portions of the attracting block(s) 21 and of the accommodation hole(s) 12, as shown in FIG. 6B, thereby protecting the attracting block(s) 21 and beautifying the appearance. It is understood that the shield piece may cover either both the front and rear surfaces 13/14 or just the front surface 13 or rear surface 14 of the protection filter body 10. The shield piece 30 may be a plastic piece made of PU, PC, PMMA, PE, PVC or PET to achieve dirt-proof, water-repellent and abrasion-resistant effects; alternatively, the shield piece 30 may be a piece made of rubber, silicon, leather or cloth materials, which may be transparent, translucent or opaque. In another embodiments, the shield piece 30 may be formed by printing an ink layer consisting of known ink solutions, or any materials mentioned in the examples introduced within the instant disclosure made as ink solutions.

Figure 6A:
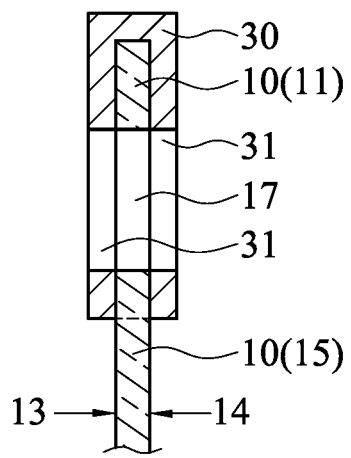
FIG. 6A is a partial sectional view along Line A-A' in FIG. 6.
Figure 6B:
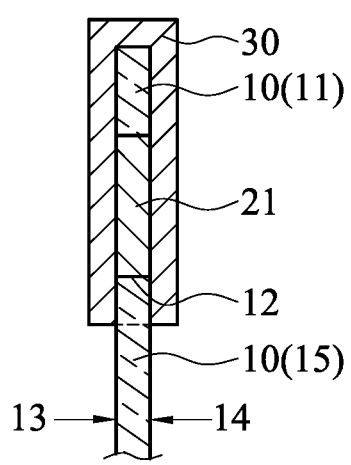
FIG. 6B is a partial sectional view along Line B-B' in FIG. 6.
Figure 6C:
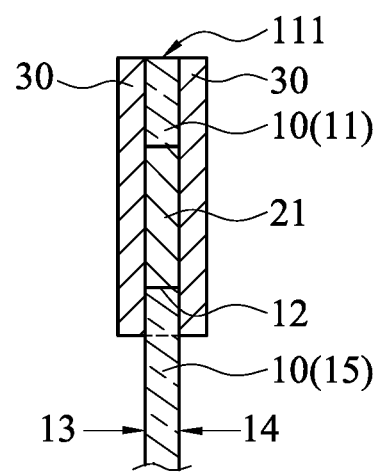
FIG. 6C is a partial sectional view, corresponding to Line B-B' in FIG. 6, of another embodiment of the instant disclosure.
Figure 7:
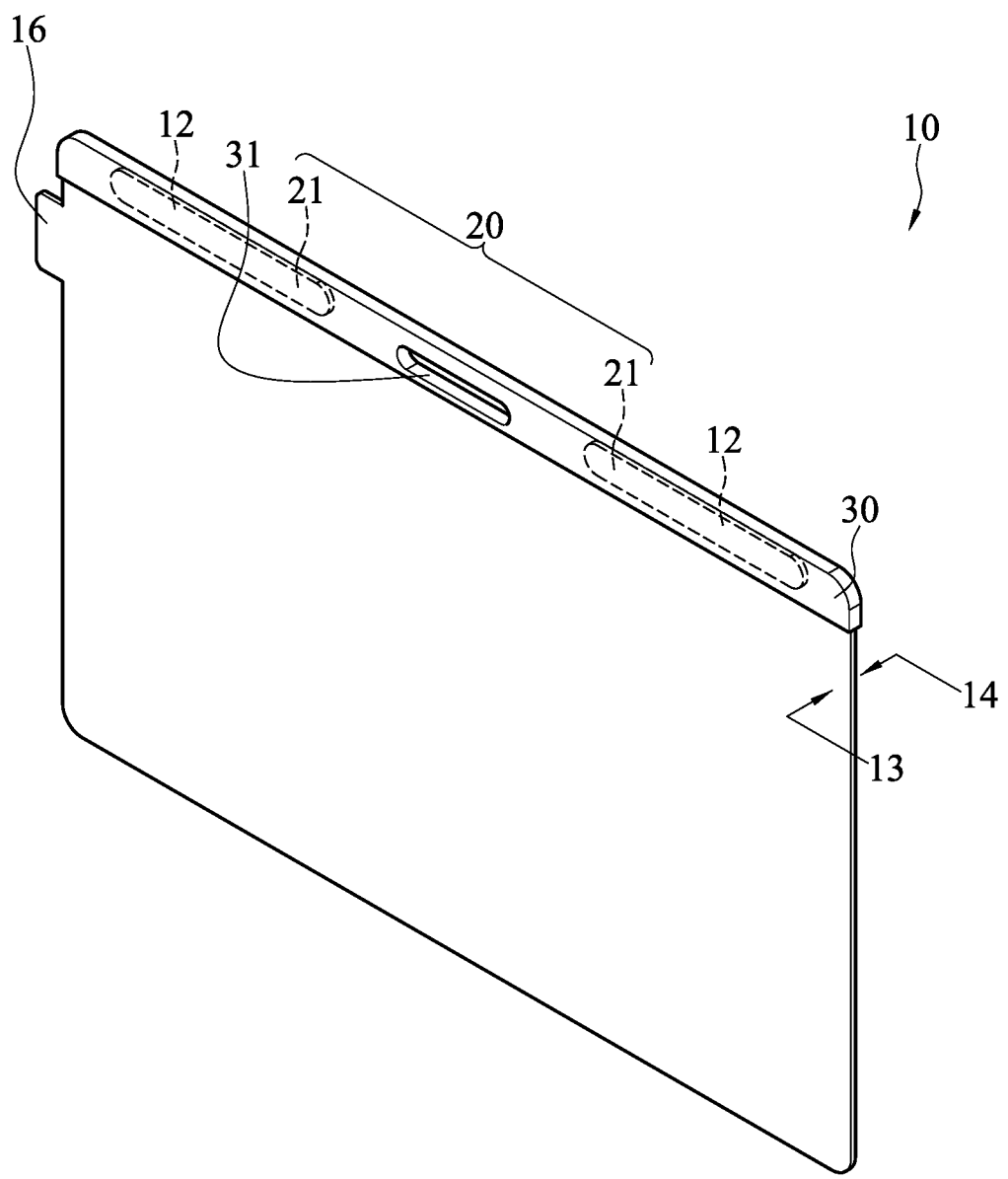
FIG. 7 is a perspective view of a screen protection filter according to a fourth exemplary embodiment of the instant disclosure.

As shown in FIGS. 6, 6A and 6B, in an embodiment of the application, a through hole 31 is further defined on the shield piece 30. Please jointly refer to FIG. 2, the through hole 31 is defined corresponding to the opening 17 of the protection filter body 10 and the visual sensor 5 of the electronic device 2, so as to prevent the visual sensor 5 from being covered by the shield piece 30 when the screen protection filter 1 is attached onto the electronic device 2. The shield piece 30 may cover the inner wall of the opening 17, as shown in FIG. 7. Alternatively, the shield piece 30 may not cover the inner wall of the opening 17 and leave the inner wall of the opening 17 exposed, as shown in FIGS. 6 and 6A. In the embodiment of FIGS. 6, 6A and 6B, the top lengthwise side surface 111 of the protection filter body 10 is covered by the shield piece 30. Refer to FIG. 6C, which illustrates a partial sectional view, corresponding to Line B-B' in FIG. 6 of another embodiment of the instant disclosure in which two shield pieces 30 are provided, one on the front surface 12 and another on the rear surface 14, leaving the top lengthwise side surface 111 of the protection filter body 10 exposed. It is noted that when the screen protection filter 1 is attached to the electronic device 2, the shield piece 30 can provide buffering effect there between. In some embodiments, other openings or holes may be further defined in the shield piece(s) 30 to correspond to other functional components of electronic device 2 (such as light(s), earphone jack(s) or functional button(s)), which are not illustrated in the drawings.

Refer to FIG. 7, which is a perspective view of a screen protection filter according to a fourth exemplary embodiment of the instant disclosure. A difference between the embodiment and the third embodiment is that a pulling piece 16 is extended at an edge of the protection filter body 10, so that after the screen protection filter 1 is attached to the electronic device 2, the pulling piece 16 protrudes from a side of the electronic device 2. When the user has the need to remove the screen protection filter 1, the pulling piece 16 may be held by the user and applied with outward force to remove the screen protection filter 1 from the electronic device 2. Additionally, the pulling piece 16 and the protection filter body 10 in some embodiments may be formed in one piece to achieve better structural strength and faster manufacturing art.

Figure 8:
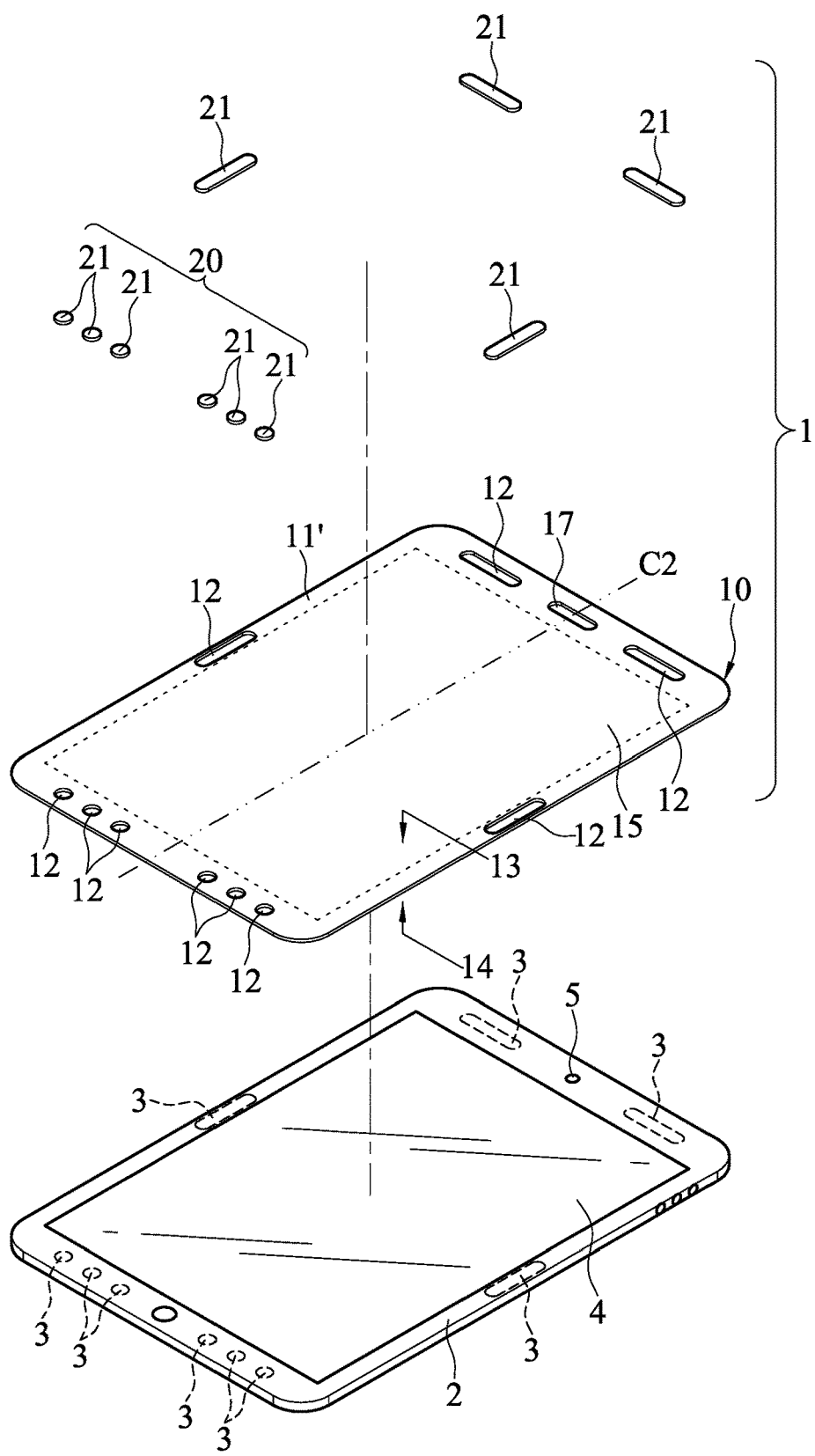
FIG. 8 is a perspective view of a screen protection filter according to a fifth exemplary embodiment of the instant disclosure.

Refer to FIG. 8, which is a perspective view of a screen protection filter according to a fifth exemplary embodiment of the instant disclosure. In the embodiment, the electronic device 2 is a tablet computer, and the attraction area 11' of the screen protection filter 1 is defined along the peripheral of the protection filter body 10. The accommodation holes 12 are defined at all four edges of the protection filter body 10, and each of the accommodation holes 12 has an attracting block 21 positioned therein, corresponding to the attraction components 3 configured inside the electronic device 2. Preferably, these accommodation holes 12 and attracting blocks 21 are defined with symmetry according to a center line C2 of the protection filter body 10 to achieve better attaching effect. In another embodiments, the accommodation hole 12 and the attracting block 21 positioned therein may be disposed at just one lengthwise edge, or one widthwise edge, or two opposite lengthwise edges, or two opposite widthwise edges, or even three adjacent edges of the protection filter body 10. In other words, one or multiple edges of the protection filter body 10 are capable of attaching to the attraction component 3 of the electronic device 2.

Figure 9:
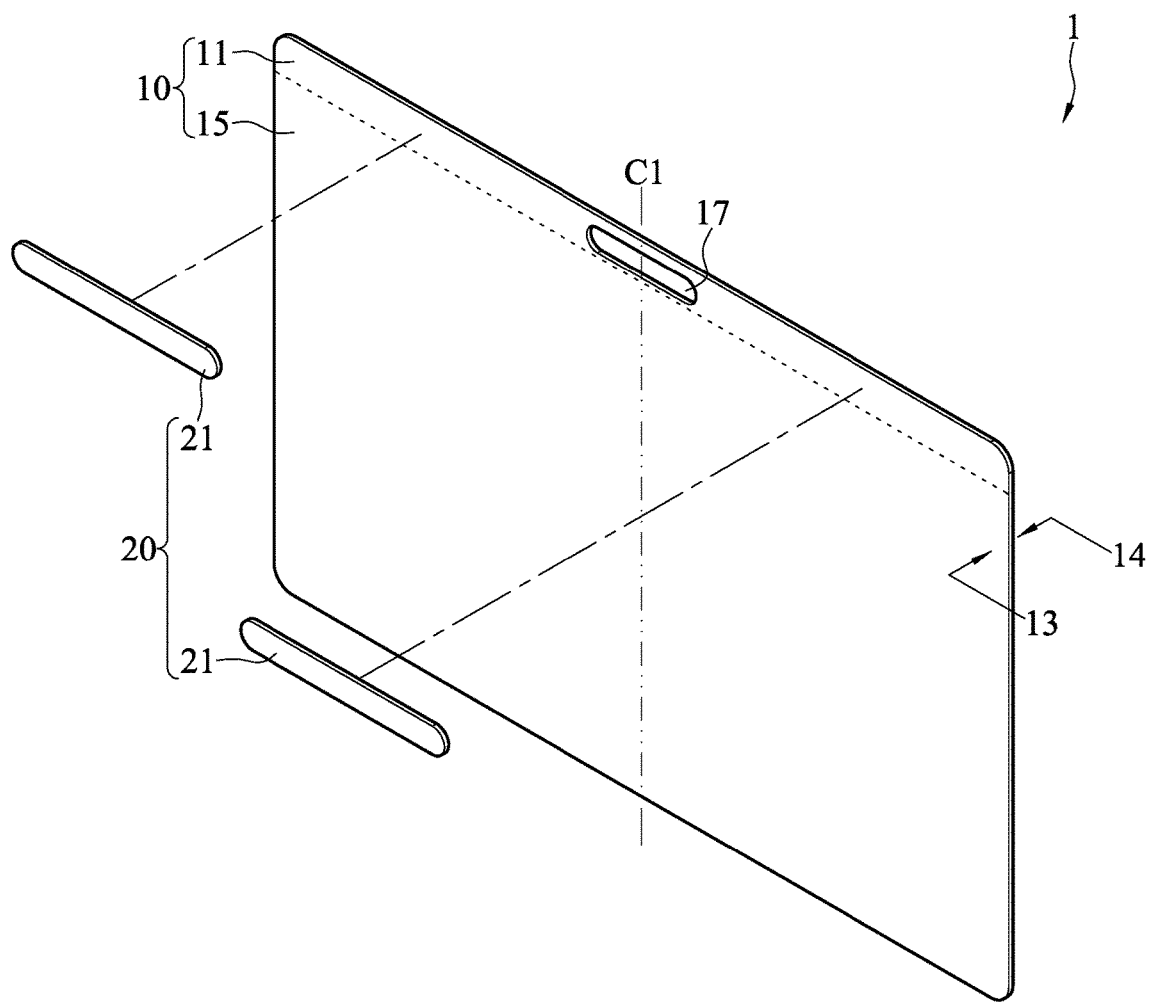
FIG. 9 is a perspective view of a screen protection filter according to a sixth exemplary embodiment of the instant disclosure.
Figure 10:
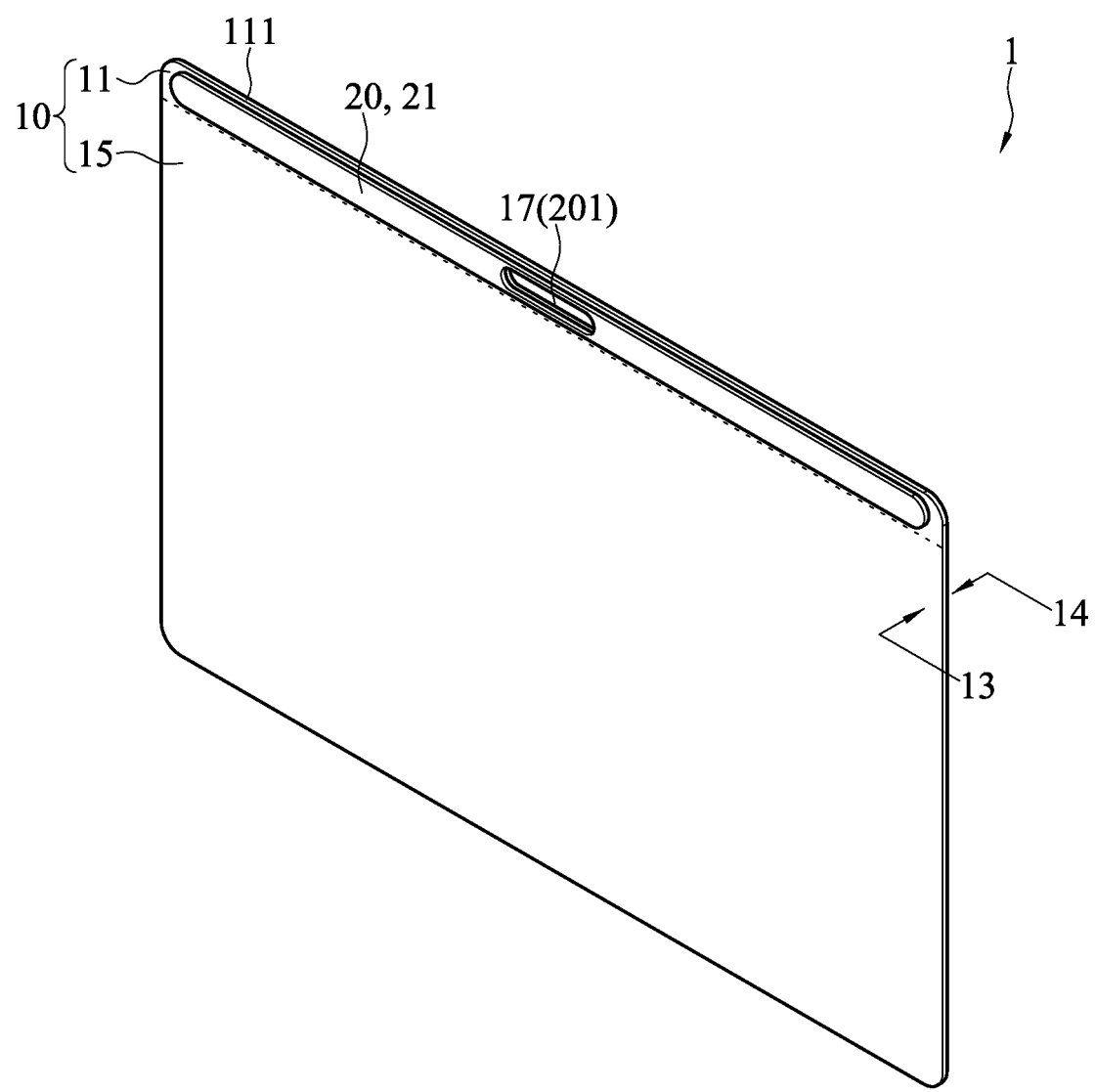
FIG. 10 is a perspective view of a screen protection filter according to a seventh exemplary embodiment of the instant disclosure.
Figure 10A:
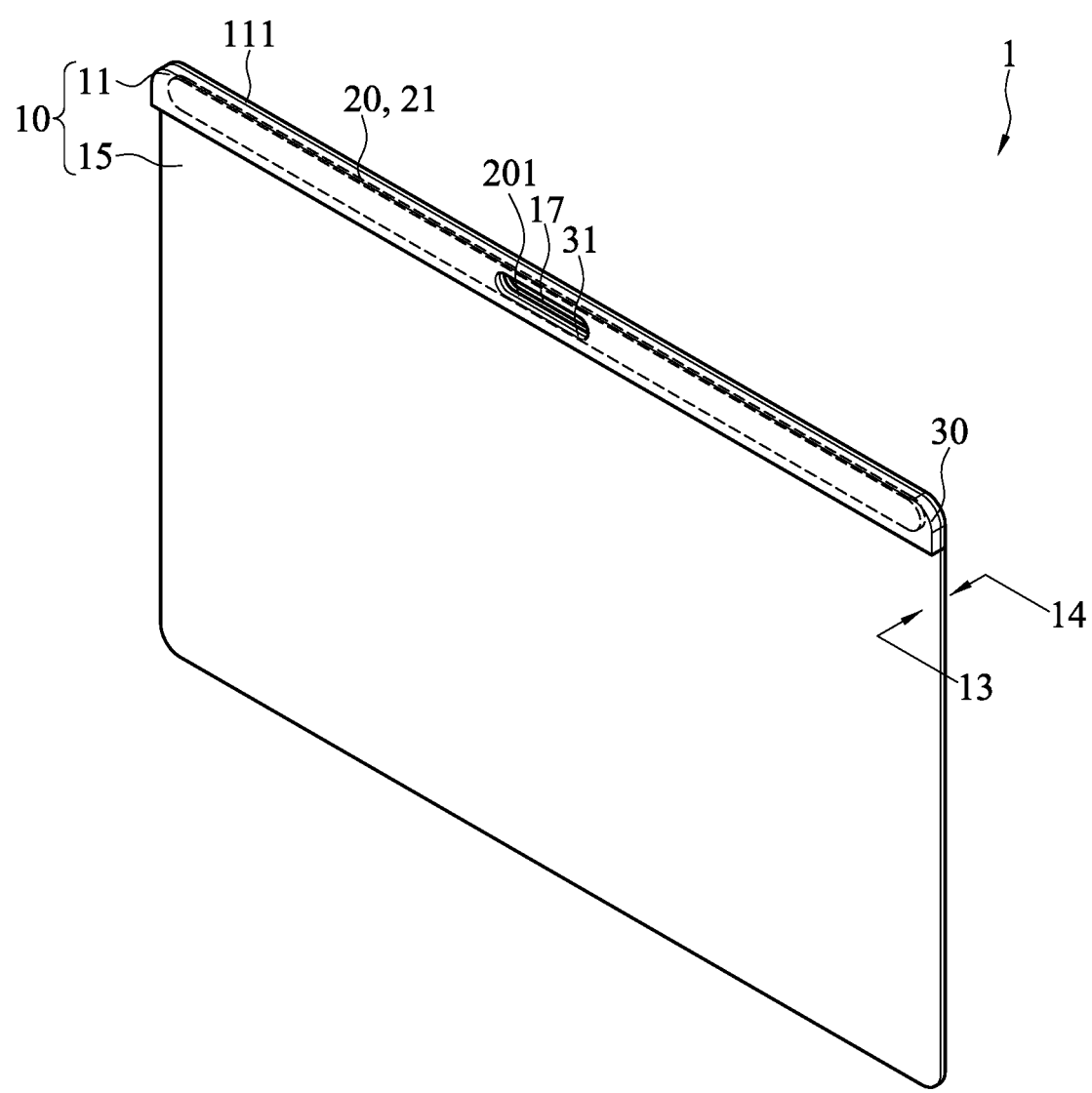
FIG. 10A is a perspective view of a screen protection filter according to a seventh exemplary embodiment of the instant disclosure.

Refer to FIG. 9, which is a perspective view of a screen protection filter according to a sixth exemplary embodiment of the instant disclosure. In the embodiment, the accommodation hole 12 is omitted on the screen protection filter 1, and the attracting member 20 is disposed directly on the front surface 13 of the protection filter body 10 in the attraction area 11. For example, the attracting member 20 may be positioned on the surface 13 of the protection filter body 10 in the attraction area 11 by adhering or heat compression. In this embodiment, the attracting member 20 includes multiple attracting blocks 21, which are disposed with symmetry according to the center line C1 of the protection filter body 10. Alternatively, as shown in FIG. 10, the attracting member 20 may comprise a single, long bar-shaped attracting block 21 and cover most of the attraction area 11, with an opening 201 of the attracting block 21 corresponding to the opening 17 of the protection filter body 10. Namely, the attracting block 21 may be disposed at a lengthwise edge of the protection filter body 10, adjacent to the lengthwise side surface 111 of the lengthwise edge of the protection filter body 10. In another embodiment, the attracting member 20 may have exactly the same shape and size as the attraction area 11, covering over the entire attraction area 11. In embodiments of the application, the outer portion(s) of the attracting member(s) 20 in either FIG. 9 or FIG. 10 may also be covered by one or more shield pieces 30, as shown in FIGS. 6, 6A, 6B, 6C and 10A. In different embodiments, one or more shield pieces 30 is configured to cover portions of one or both of the front and rear surfaces 13/14 in the attraction area 11, and on outer surfaces of the attracting block(s) 21. In addition, the shield piece 30 may cover over the entire side surface 111 of the protection filter body 10 in the attraction area 11, or only some of the side surface 111 of the protection filter body 10 in the attraction area 11. In embodiments of the application, the shield piece(s) 30 may, for example, cover one or both of the front and rear surfaces 13/14 of the protection filter body 10 (in the location of the attraction area 11), with the attracting block(s) 21 disposed between a shield piece 30 and the protection filter body 10 or disposed within the protection filter body 10. Moreover, in some embodiments of the application, one or more of the side surface(s) of the protection filter body 10 may covered by the shield piece 30, while in other embodiments of the application the side surface(s) of the protection filter body 10 may be exposed. It is also noted that while center lines C1, C2 have been disclosed in FIG. 1, FIG. 5, FIG. 8, FIG. 9 and in several paragraphs in Detailed Description to illustrate symmetrical positioning of the accommodation holes 12, in other embodiments of the application, the positioning of the attracting blocks 21 is not symmetrical. This is particularly useful in embodiments for which the attraction components 3 of the electronic device 2 on which the protection filter body 10 will be disposed do not have a symmetrical arrangement.

Figure 11:
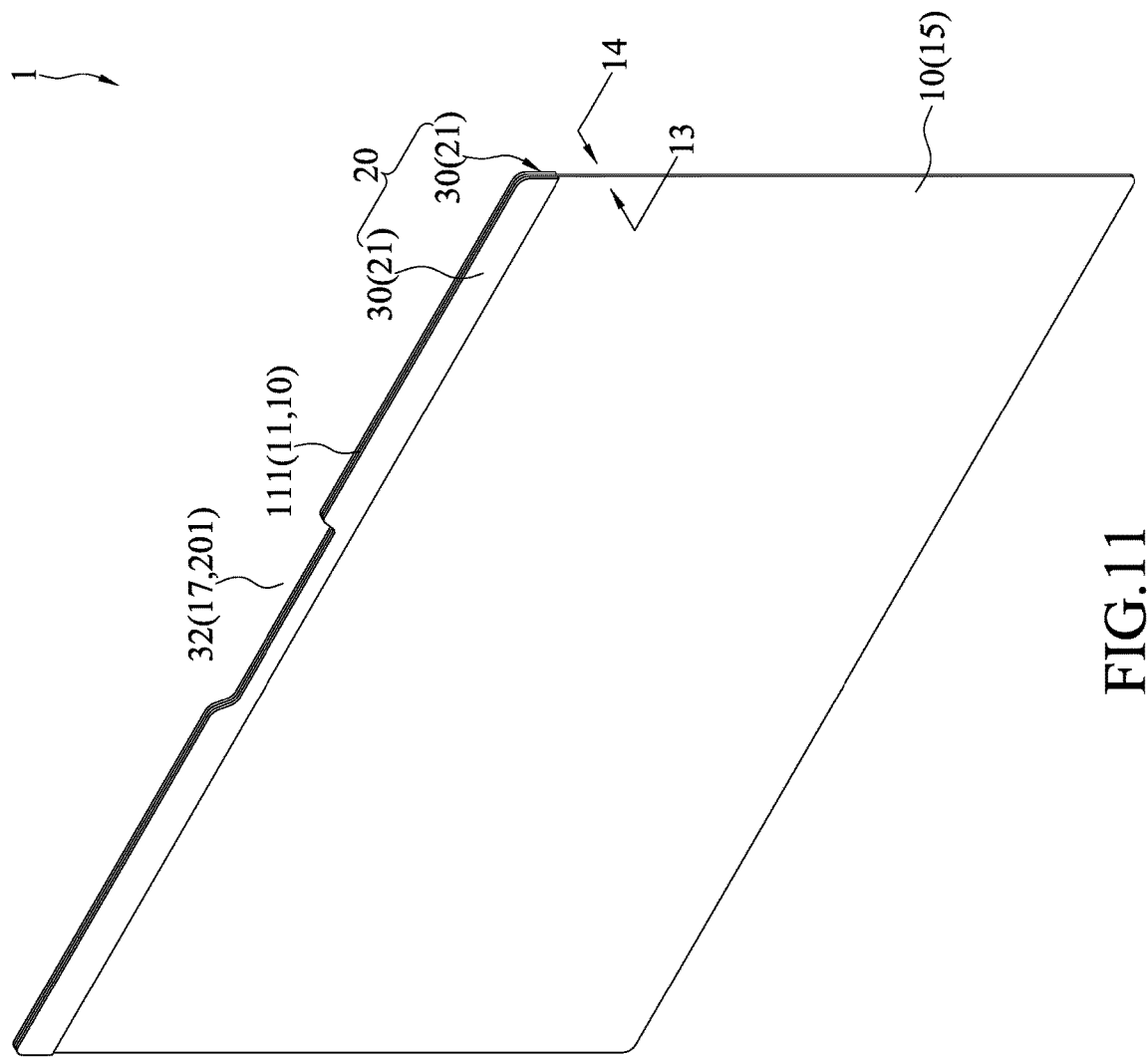
FIG. 11 is a perspective view of a screen protection filter according to another exemplary embodiment of the instant disclosure.
Figure 12:
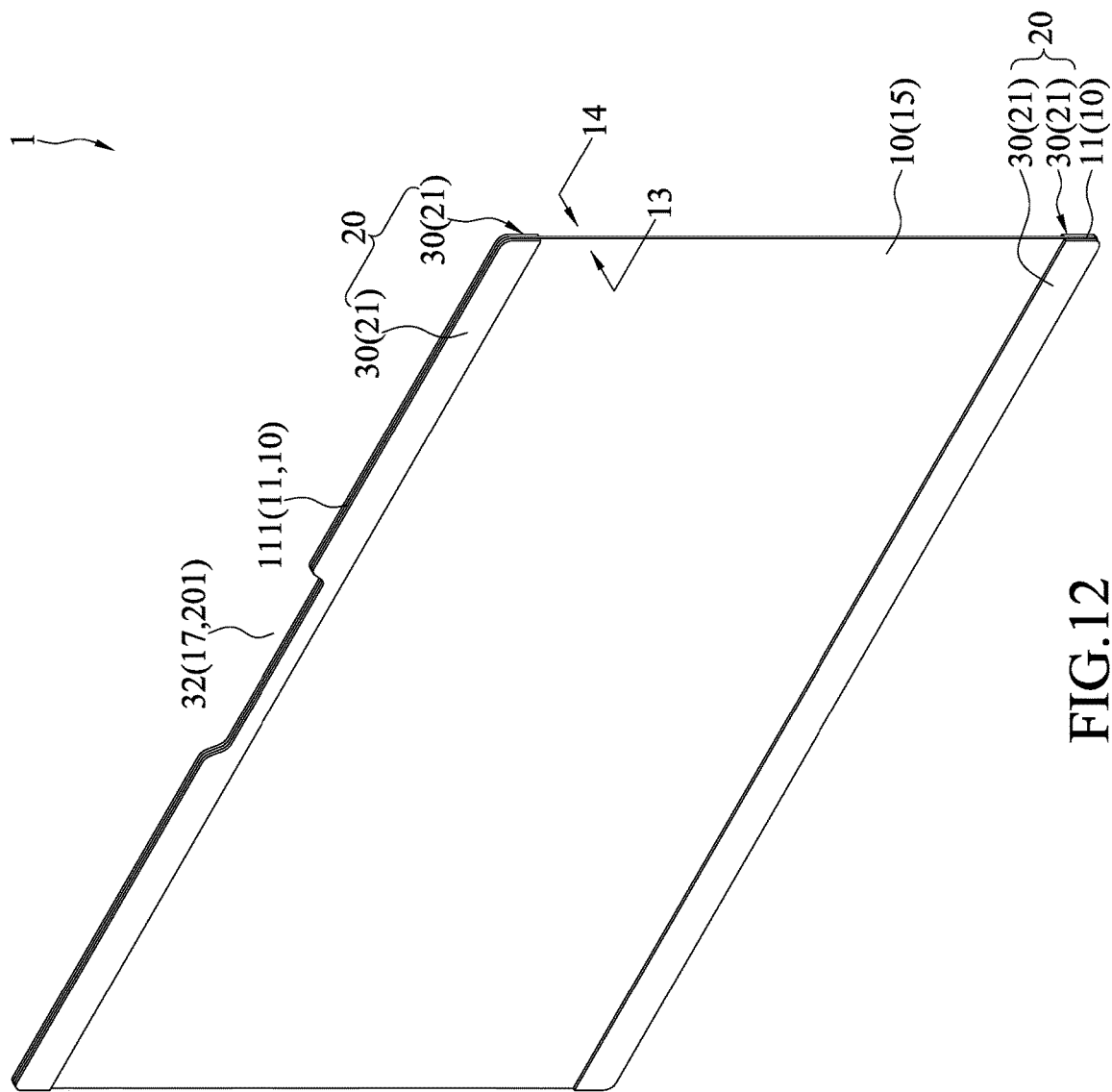
FIG. 12 is a perspective view of a screen protection filter according to another exemplary embodiment of the instant disclosure.
Figure 13:
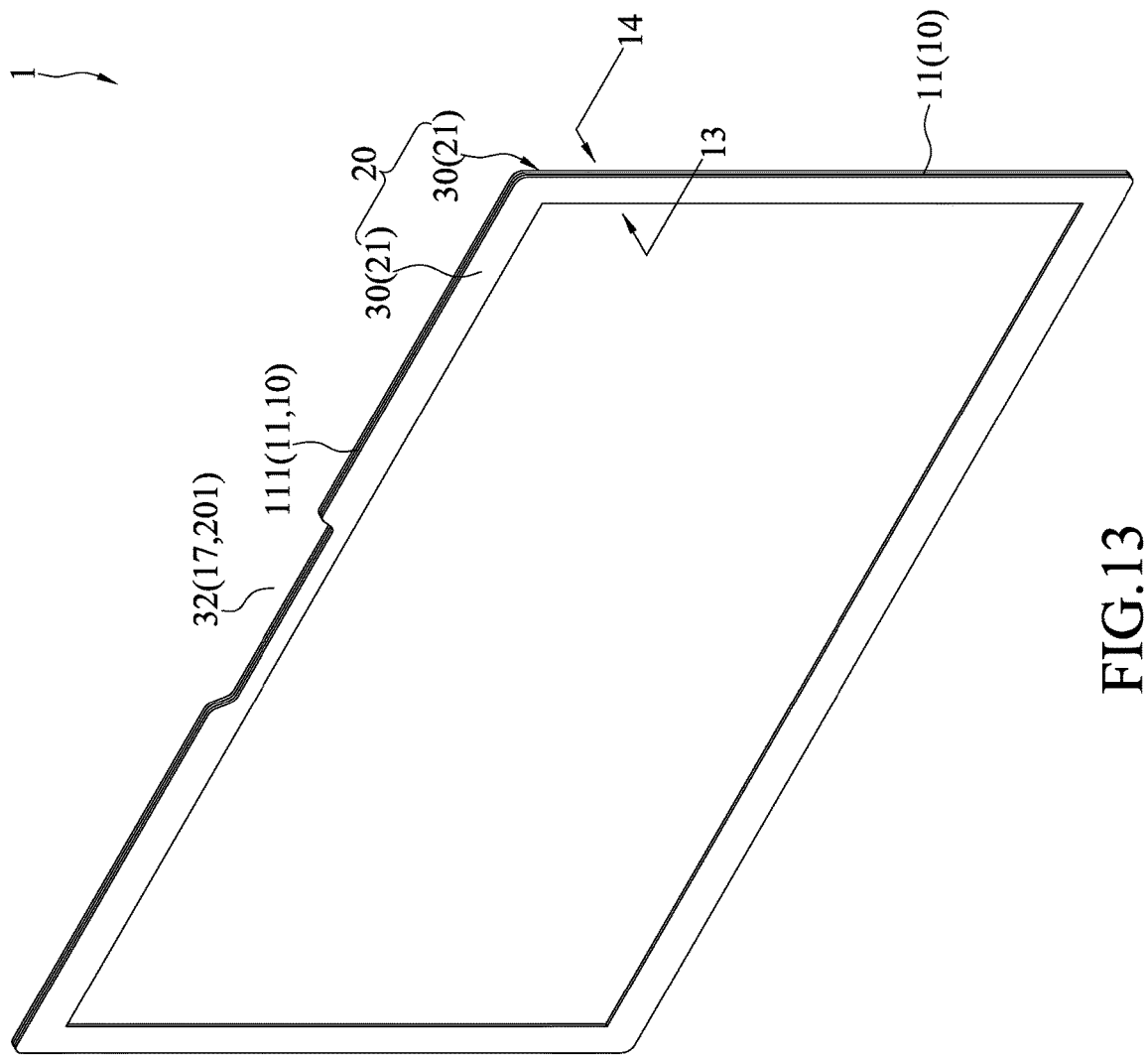
FIG. 13 is a perspective view of a screen protection filter according to another exemplary embodiment of the instant disclosure.

With reference to FIGS. 11, 12, 13, in additional embodiments of the application, an attracting member 20 comprising one or more attracting blocks 21 may be disposed at just one lengthwise edge (FIG. 11) or one widthwise edge (not shown), or two opposite lengthwise edges (FIG. 12) or two opposite widthwise edges (not shown), or all four edges (FIG. 13), or even three edges (not shown) of the protection filter body 10. Similarly, one or more shield pieces 30 may be disposed on the front and/or rear surfaces 13/14 of the protection filter body 10 covering the attracting blocks 21. Thus, in embodiments of the application, one or multiple edges of the protection filter body 10 may be configured to attach to the attraction component 3 of the electronic device 2 by magnetic forces. Moreover, in any of the above-mentioned embodiments, examples and drawings, a notch 32 of at least one shield piece 30, as well as the corresponding opening 17 of the protection filter body 10 and the corresponding opening 201 of the attracting block 21 may all be defined as recesses of the same or similar shape. Therefore, when the screen protection filter 1 is removably attached to the display screen 4 of different electronic devices 2, the notch(es) 32 of the shield piece(s) 30, the corresponding opening 17 of the protection filter body 10 and the corresponding opening 201 of the attracting member 20 are arranged to expose and otherwise avoid interference with the functionality of a variety of the electronic devices 2, namely to avoid covering various sizes, shapes, positions and/or number of functional component(s) (such as visual sensors 5, light(s), earphone jack(s) or functional button(s)) of different electronic devices 2. In embodiments of the application, shapes of the notch(es) 32 of the shield piece(s) 30, the corresponding opening 17 of the protection filter body 10 and the corresponding opening 201 of the attracting member 21 may be trapezoid or rectangular.

In FIGS. 11, 12, 13, the attracting blocks 21 may comprise lengthy, thin, magnetic/ferromagnetic sheets or metallic sheet/band/papers disposed at one or more corresponding edges (one lengthwise edge in FIG. 11; two opposite lengthwise edges in FIG. 12; and four edges in FIG. 13) of privacy filter body 10 disposed in attraction area(s) 11. The attracting blocks 21 may cover an entire edge or edges of the protection filter body 10, as illustrated in FIGS. 11 and 12, or there may be an exposed rim of the front surface 13 exposed by the attracting block 21, as illustrated in FIG. 10. The attracting block(s) 21 may cover the front and/or rear surfaces of the protection filter body 10 in the attraction area 11. The shield piece(s) 30 may, accordingly, cover the attracting block(s) 21. In some embodiments of the application, the attracting blocks 21 may be disposed at three edges of the protection filter body 10. In FIGS. 11, 12 and FIG. 13, the side surface 111 of the protection filter body 10 in the attraction area 11 (at the lengthwise/widthwise edge or the corners) of the protection filter body 10 may be exposed without being covered by the shield piece(s) 30. Alternatively, in other embodiments, the side surface 111 of the protection filter body 10 may be covered by the shield piece(s) 30, similar to the full coverage of the shield piece 30 illustrated in FIG. 6 and FIG. 7. In another embodiments, the shield piece(s) 30 and/or the attracting block(s) 21 configured at the rear surface of the protection filter body 10 in FIGS. 11, 12, 13 may be omitted.

Figure 14:
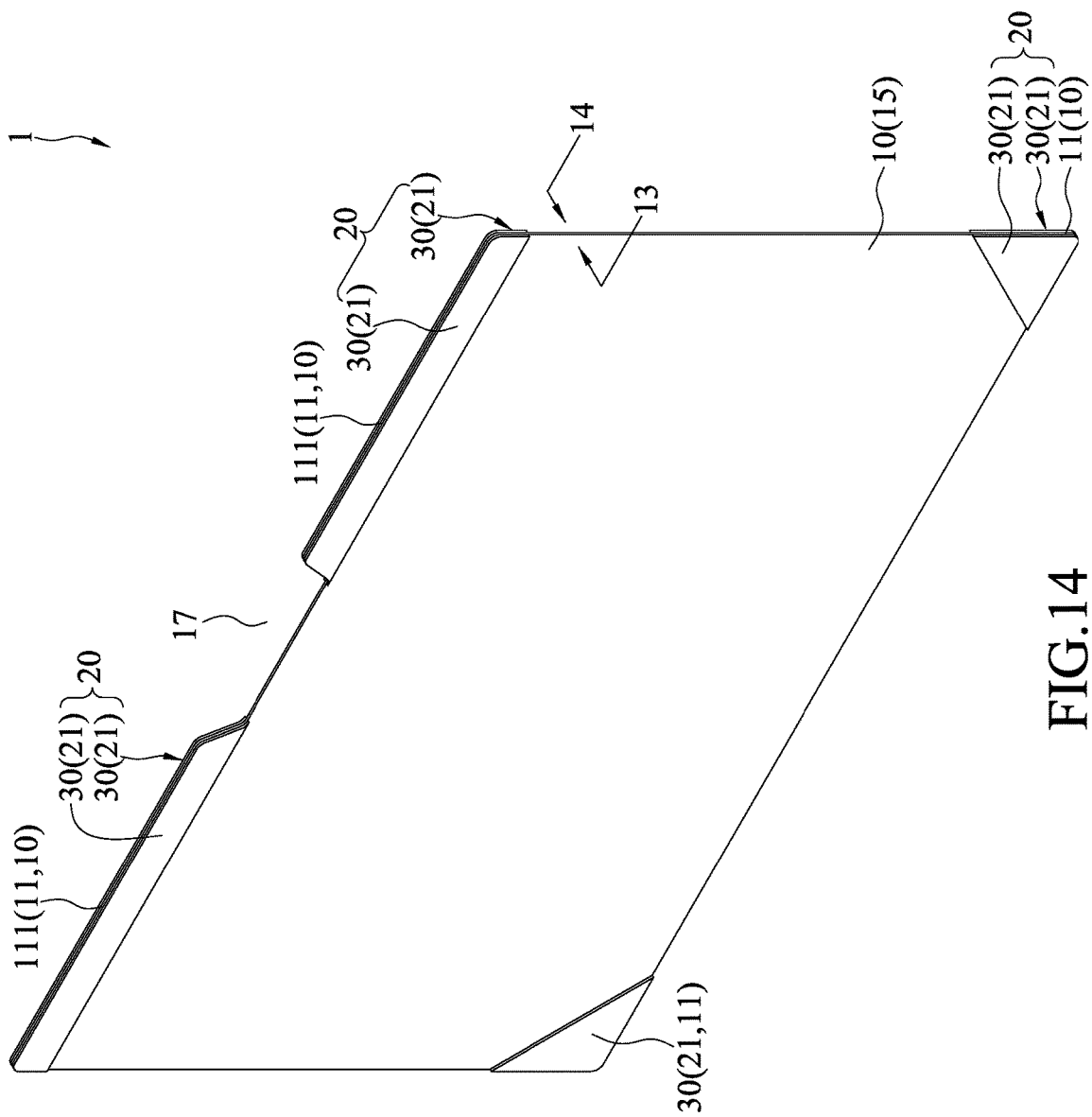
FIG. 14 is a perspective view of a screen protection filter according to another exemplary embodiment of the instant disclosure.
Figure 15:
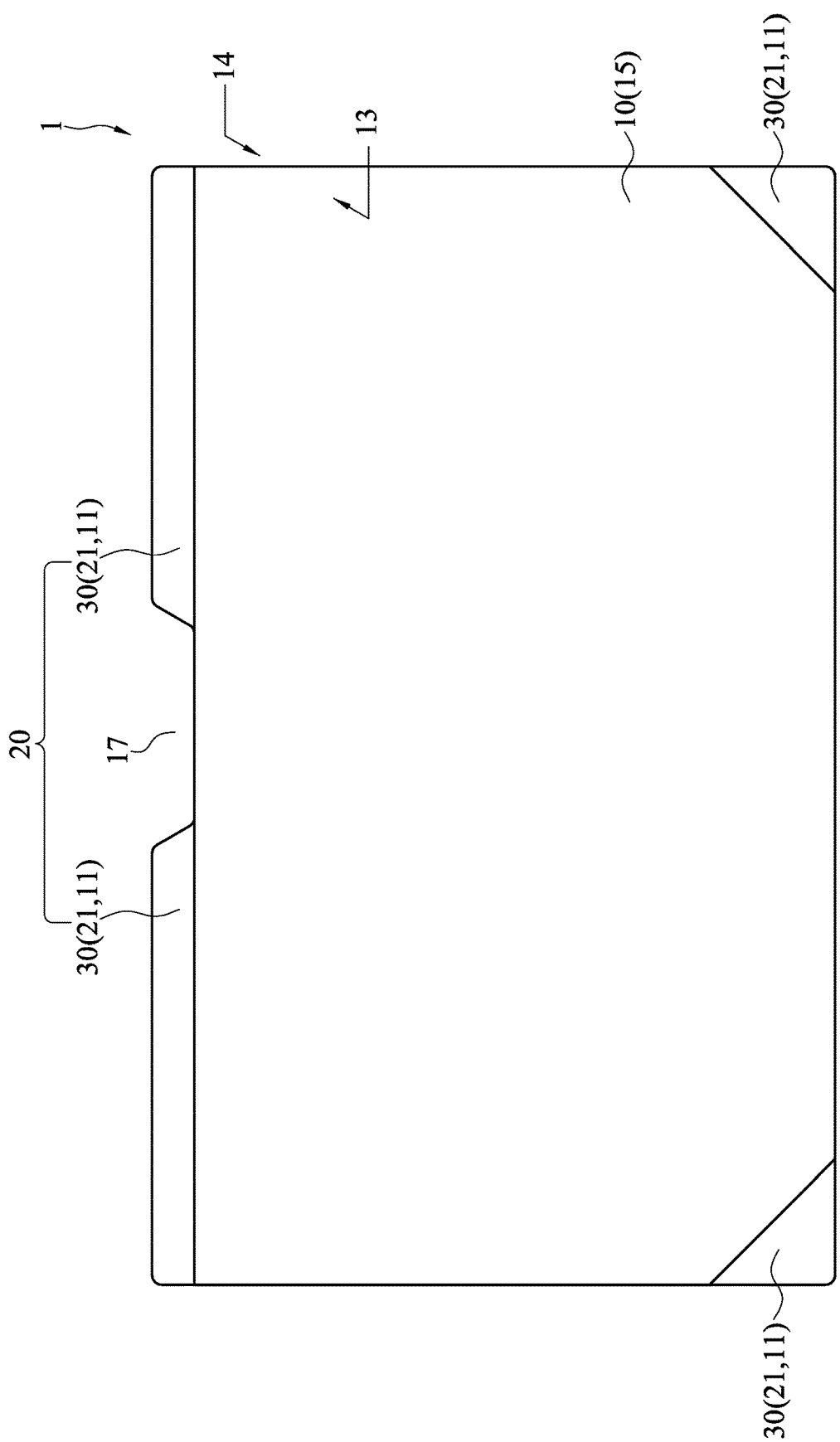
FIG. 15 is a front rear view of a screen protection filter according to another exemplary embodiment of the instant disclosure.
Figure 16:
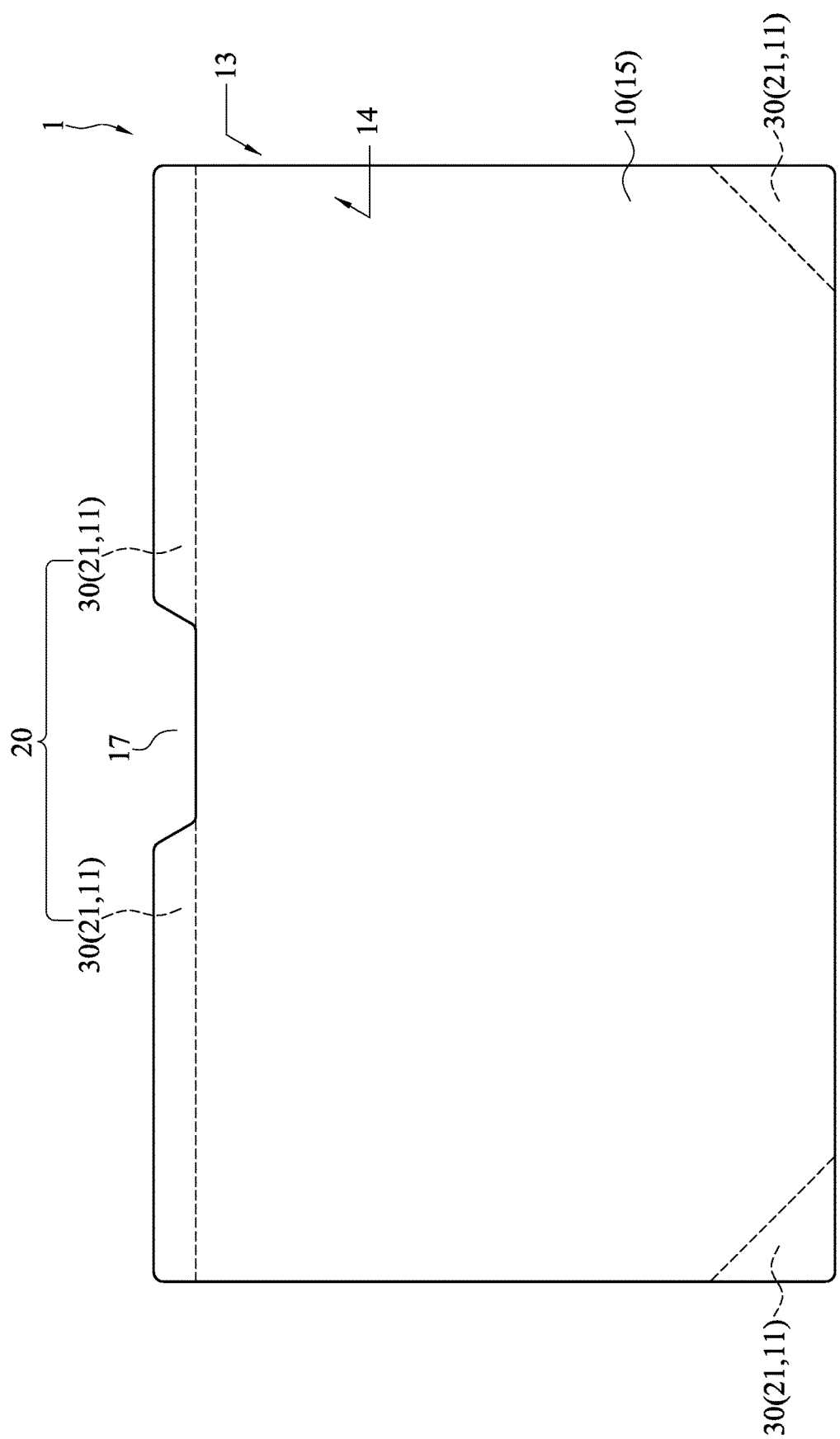
FIG. 16 is a front view of a screen protection filter according to another exemplary embodiment of the instant disclosure.
Figure 17:
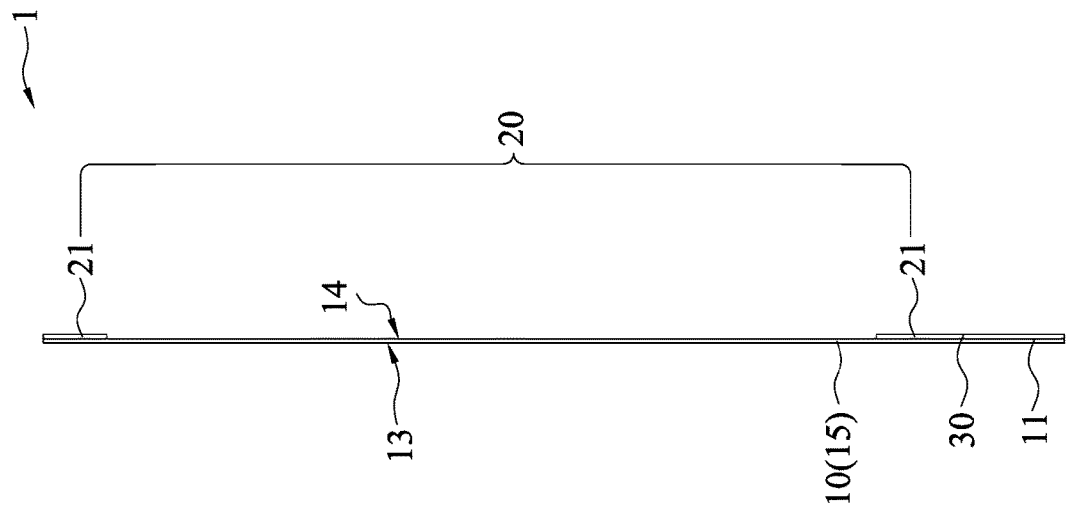
FIG. 17 is a side view of a screen protection filter according to another exemplary embodiment of the instant disclosure.
Figure 18:
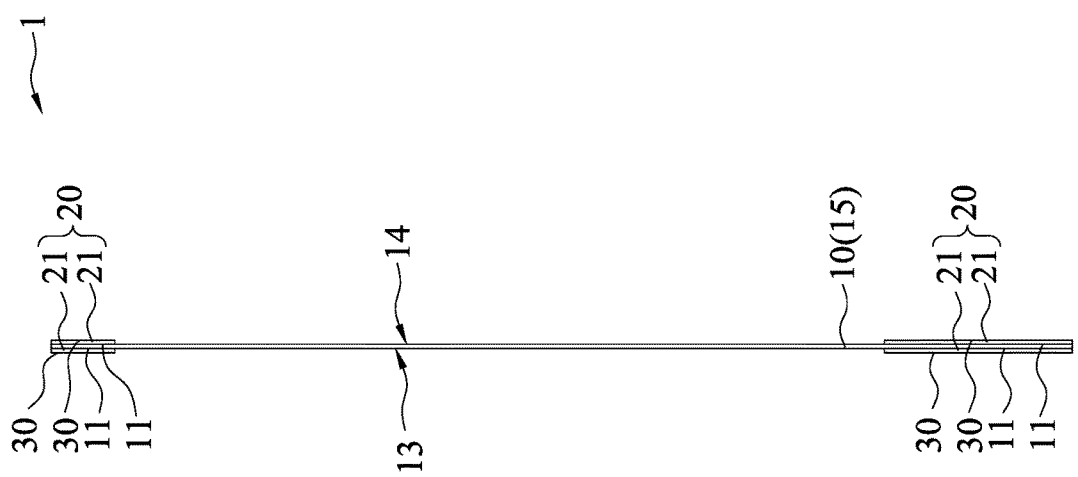
FIG. 18 is a side view of a screen protection filter according to another exemplary embodiment of the instant disclosure.
Figure 19:
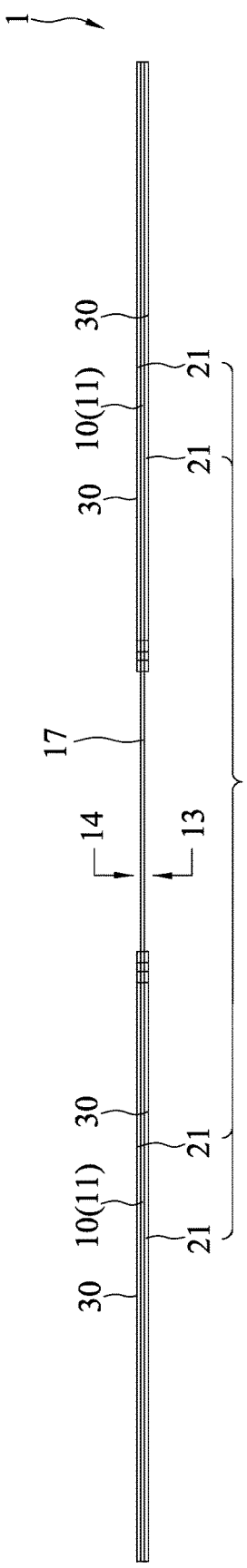
FIG. 19 is a top view of a screen protection filter according to another exemplary embodiment of the instant disclosure.
Figure 20:
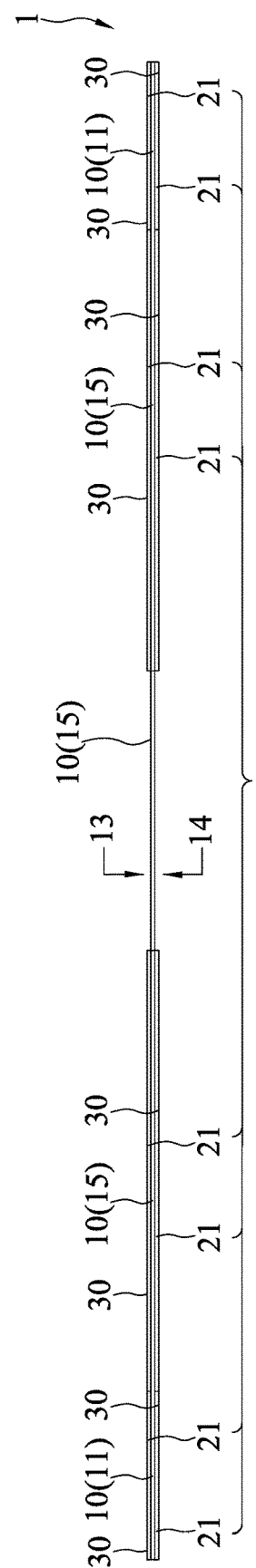
FIG. 20 is a bottom view of a screen protection filter according to another exemplary embodiment of the instant disclosure.

Refer to FIGS. 14, 15, 16, 17, 18, 19 and FIG. 20. In these embodiments, attracting block(s) 21 with various sizes/shapes/quantity may be disposed at one or more corners of the protection filter body 10 of the screen protection filter. Moreover, corresponding shield piece(s) 30 may directly cover the attracting block(s) 21. FIG. 14 is a perspective view of a screen protection filter 1 according to another exemplary embodiment of the instant disclosure. In FIG. 14, shield pieces 30 and attracting blocks 21 that are triangular and configured to cover each of the right and left bottom corners of the protection filter body 10 are provided. In embodiments of the application, the shield pieces 30 disposed at corners of the protection filter body 10 extend directly adjacent to the side surfaces of the protection filter body 10 at both of the edges that define the corner. The shield pieces 30 and the attracting blocks 21 at each of the right and left bottom corners of the protection filter body 10, or alternately just the shield pieces 30, may be triangular. In FIG. 14, attracting blocks 21 and the shield pieces 30 are configured at both front and rear surfaces 13/14 of the protection filter body 10. The corner portion of the protection filter body 10 configured with shield pieces 30 and/or the attracting blocks 21 may also be defined as portions of the attraction area 11 mentioned previously. In FIG. 14, there two are attracting blocks 21 and two shield pieces 30 extending along a lengthwise edge of the protection filter body 10 and disposed adjacent to a side surface 111 of the lengthwise (top) edge of the protection filter body 10, but having a gap there between corresponding to the location of opening 17. FIG. 15 is a front view of a screen protection filter 1 according to another exemplary embodiment of the instant disclosure. Similar to FIG. 14, in FIG. 15, two triangular shield pieces 30 are configured at the right and left corners of the protection filter body 10, with the attracting blocks 21 also being configured at the corners. However, in this embodiment, there is no shield pieces 30 or attracting blocks 21 on the rear surface 14 of the protection filter body 10. FIG. 16 is a front view of a screen protection filter 1 according to another exemplary embodiment of the instant disclosure. Similar to FIG. 14 and FIG. 15, in FIG. 16, the shield pieces 30 and the attracting blocks 21 are configured at the right/left bottom corners at the rear surface 14 of the protection filter body 10, but with no shield pieces 30 or attracting blocks 21 on the front surface 13 of the protection filter body 10. FIG. 17 is a side view of the screen protection filter 1 of an embodiment of the application illustrated in FIG. 14, wherein the shield pieces 30 do not cover the side surfaces of the protection filter body 10. FIG. 18 is the side view of the screen protection filter 1 of an embodiment of the application illustrated in FIG. 16, again in which the shield pieces 30 do not cover the side surfaces of the protection filter body 10. FIG. 19 and FIG. 20 are respectively top and bottom views of a screen protection filter 1 of an embodiment of the screen protection filter 1 in FIG. 14. As in FIG. 14, the embodiments of FIGS. 15-20 illustrate two attracting blocks 21 extending along a lengthwise edge of the protection filter body 10 and disposed adjacent to a side surface 111 of the lengthwise (top) edge of the protection filter body 10, but having a gap there between at the location of opening 17. It is noted that the gap corresponding to the opening 17 of the protection filter body 10 in FIGS. 14, 15, 16 is suitable to correspond to a broad range of various sizes, shapes, positions and/or amounts of functional component(s) (such as visual sensors 5, light(s), earphone jack(s) or functional button(s)) of different electronic devices 2. However, it is understood that in embodiments of the application, other arrangements such as an attracting block 21 having a through hole as illustrated in FIG. 10 or a notch as illustrated in FIG. 11 may be used on either on one or both of the front/rear surfaces of protection filter body 10, together with the corner attracting blocks 21 and shield pieces 30 as illustrated in FIGS. 14-20.

In another embodiment, the protection filter body 10 may include only shield pieces 30 and the attracting blocks 21 configured at the corners, without another shield piece 30 and the attracting member 20 disposed at any linear edge of the protection filter body 10.

Figure 21A:
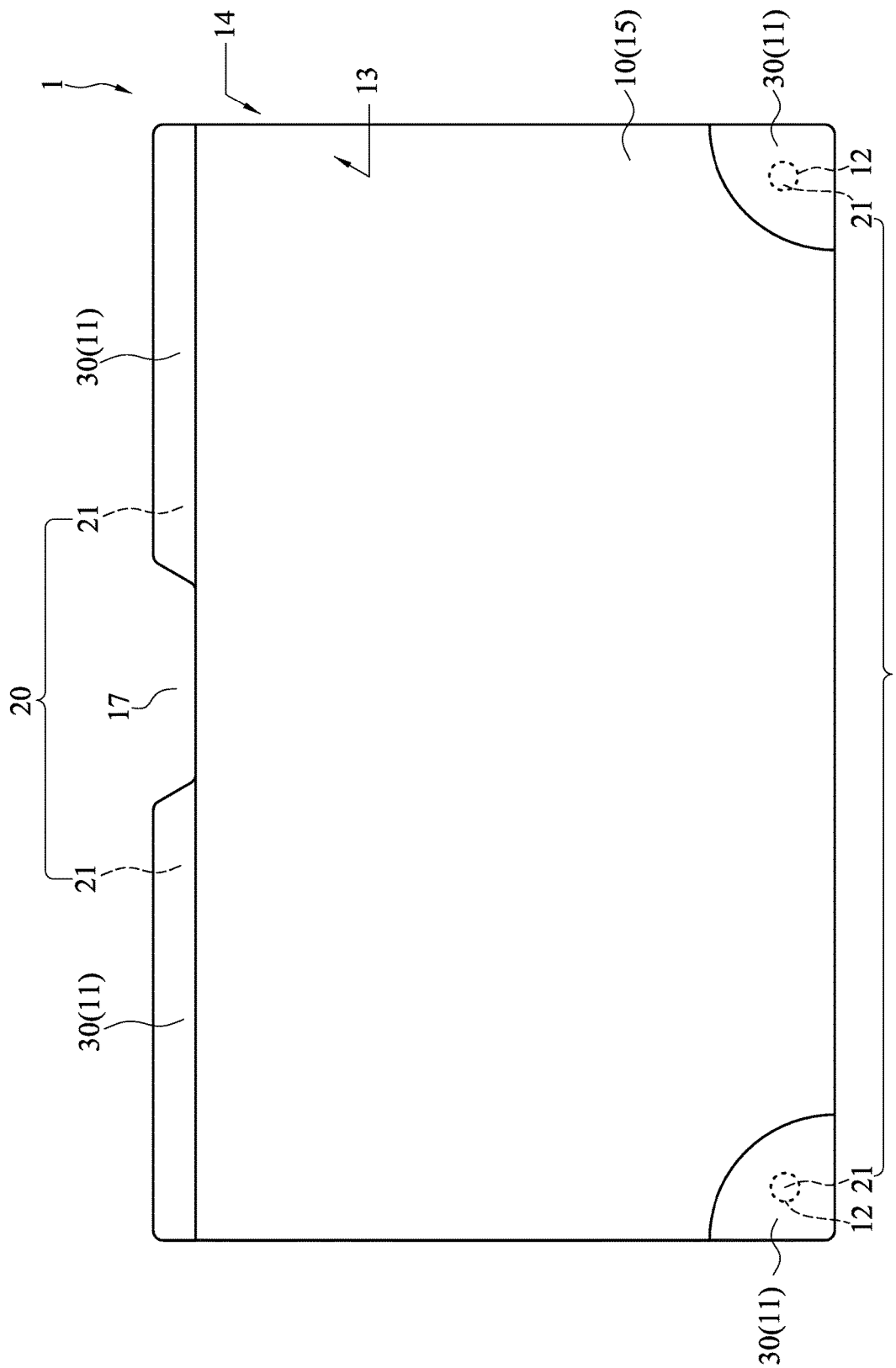
FIG. 21A is a front view of a screen protection filter according to another exemplary embodiment of the instant disclosure.
Figure 21B:
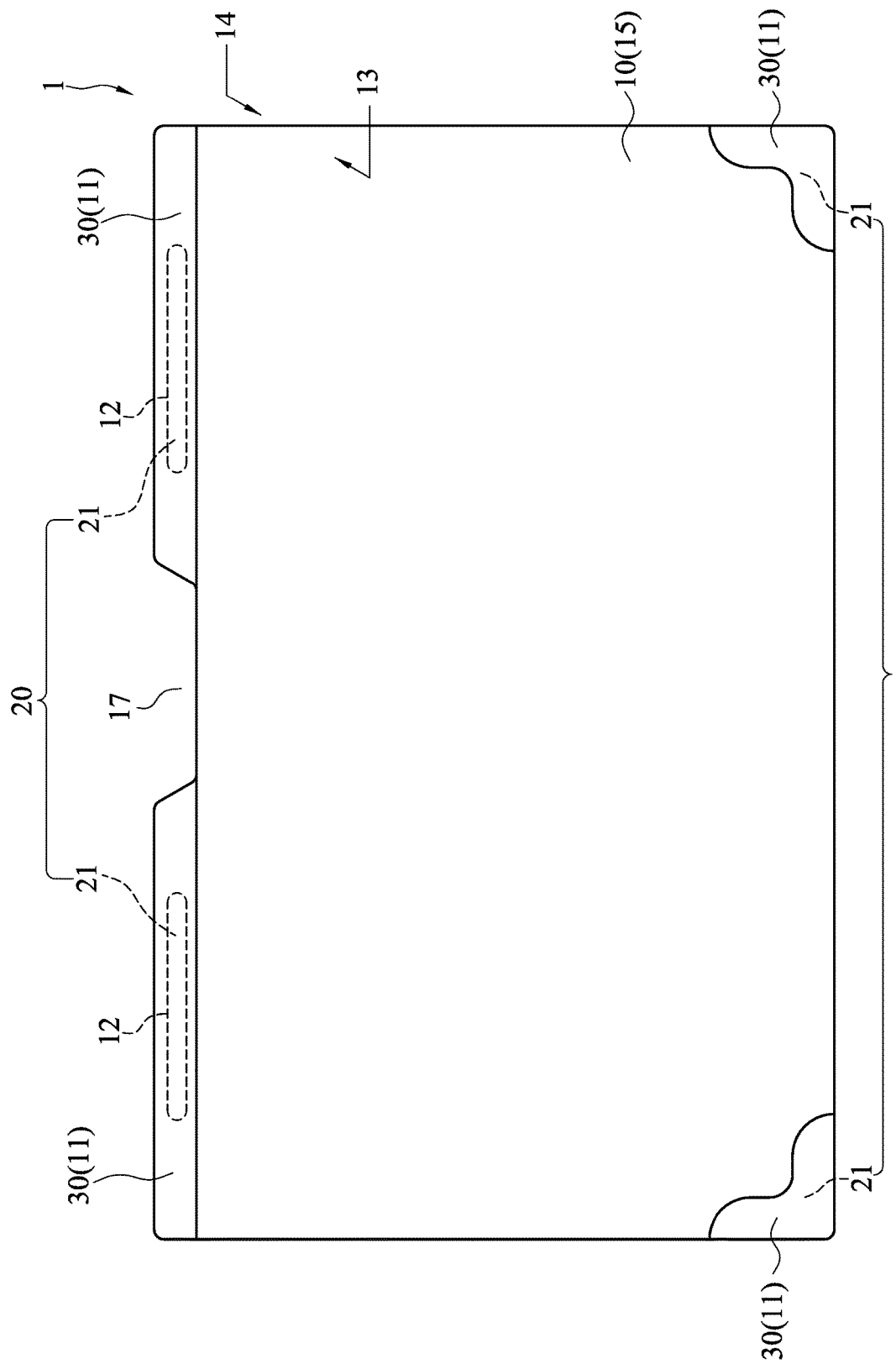
FIG. 21B is a front view of a screen protection filter according to another exemplary embodiment of the instant disclosure.
Figure 21C:
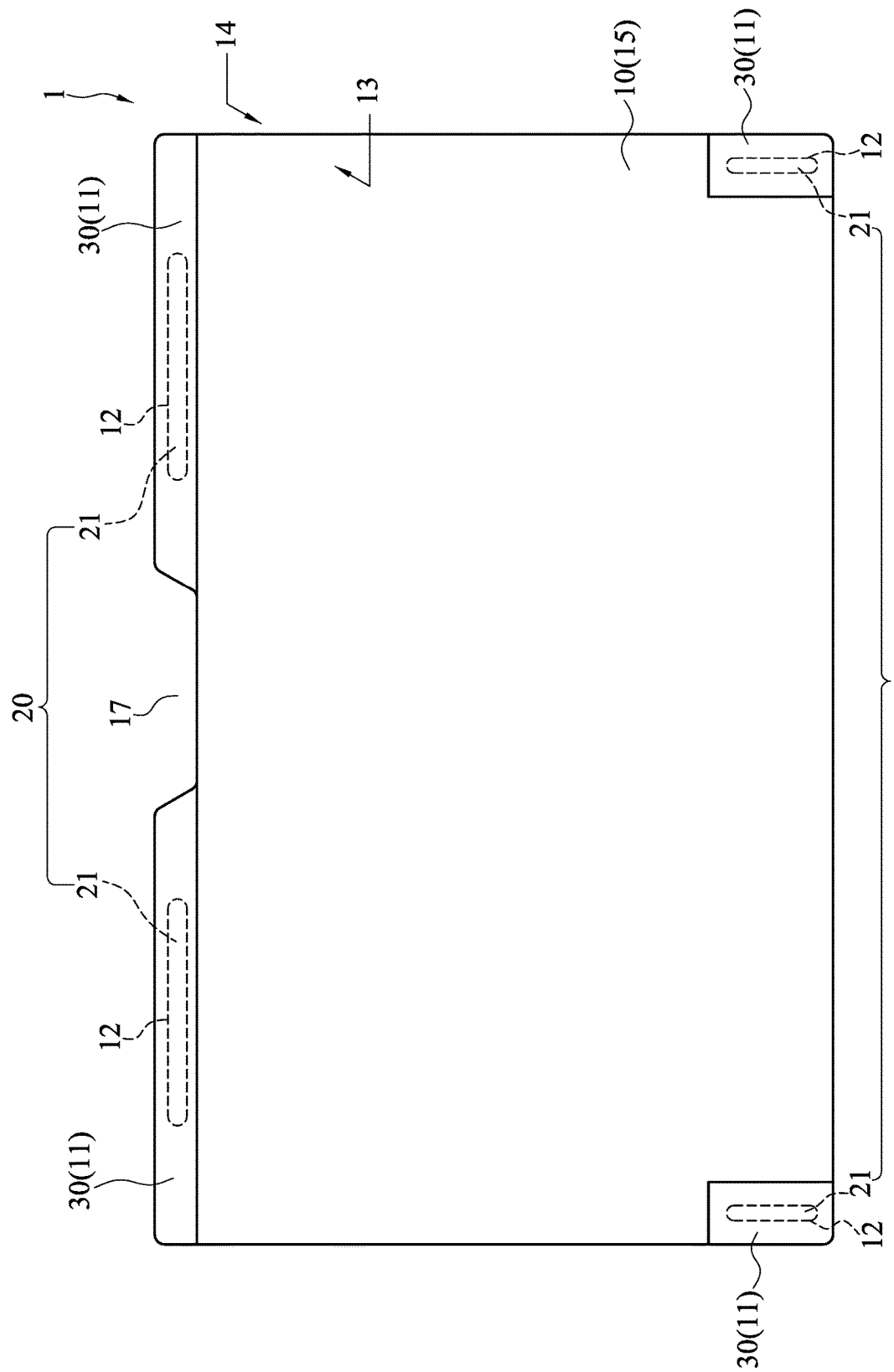
FIG. 21C is a front view of a screen protection filter according to another exemplary embodiment of the instant disclosure.
Figure 21D:
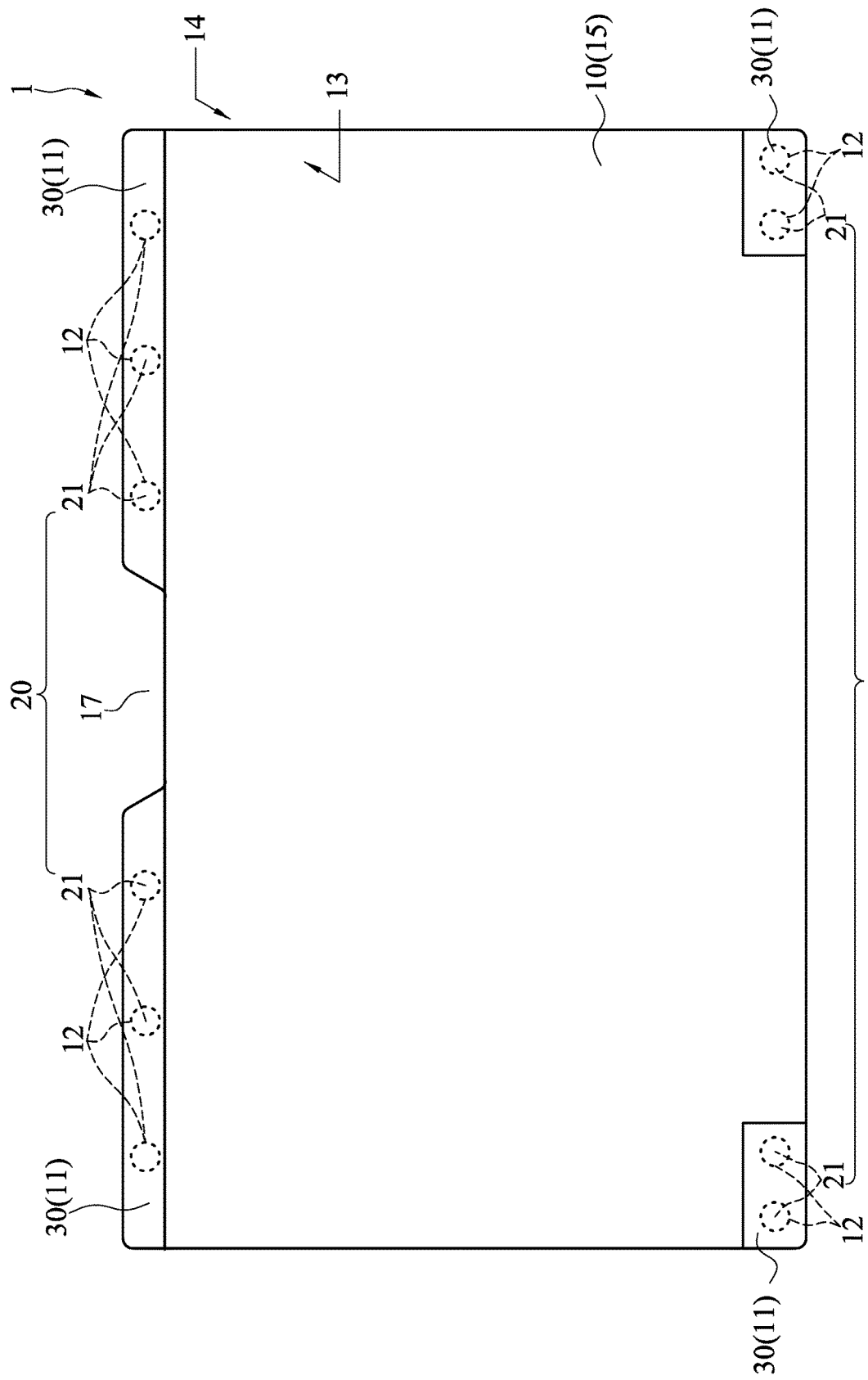
FIG. 21D is a front view of a screen protection filter according to another exemplary embodiment of the instant disclosure.
Figure 21E:
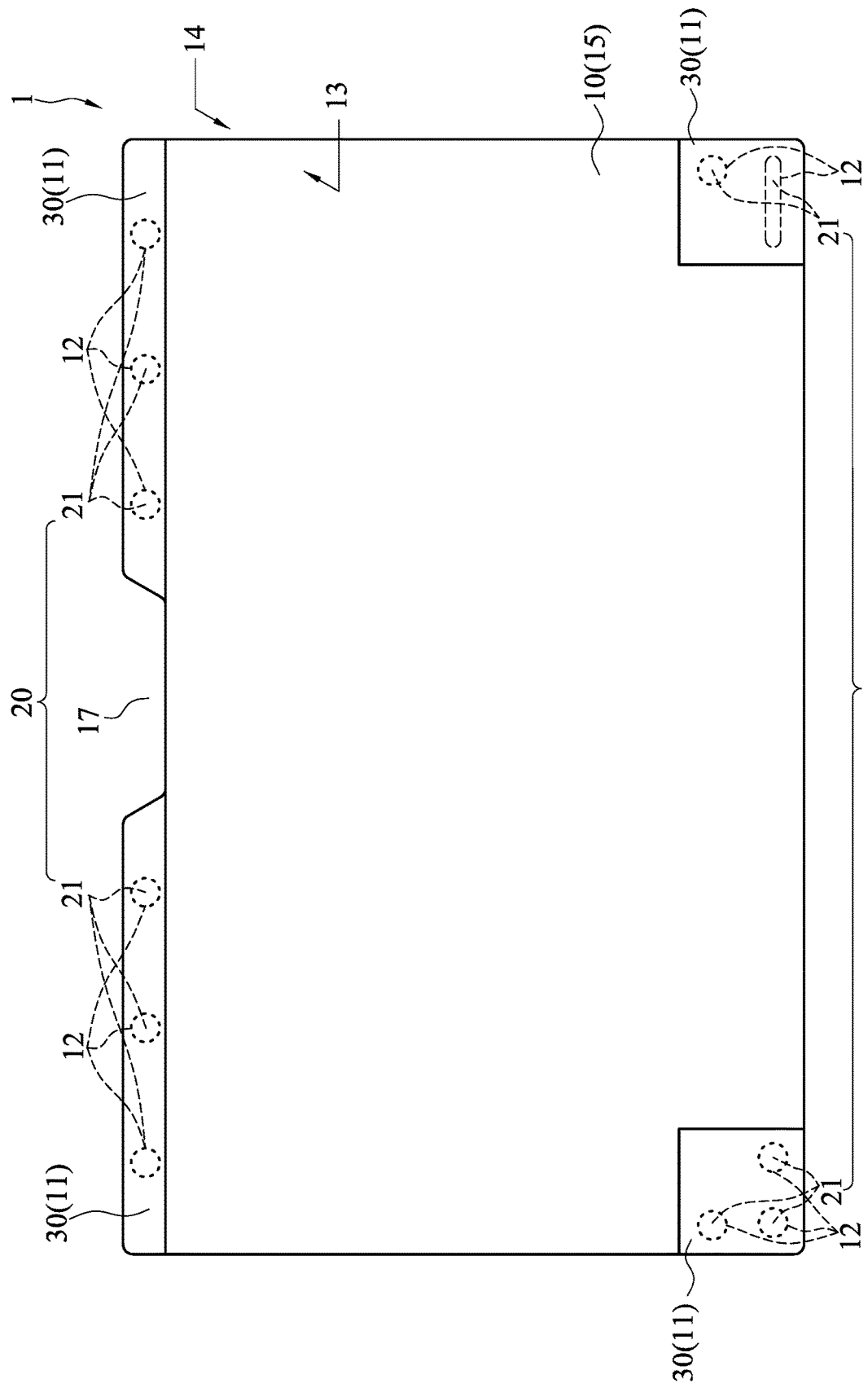
FIG. 21E is a front view of a screen protection filter according to another exemplary embodiment of the instant disclosure.

Refer to FIGS. 21A, 21B, 21C, 21D and FIG. 21E, each of which is a front view of a screen protection filter 1 according to other exemplary embodiments of the instant disclosure. Herein the shield pieces 30 configured at the right/left bottom corners of the protection filter body 10 may have different shapes, such as fan shape (FIG. 21A), L-shape (FIG. 21B), rectangular shapes (FIG. 21C and FIG. 21D) and square shape (FIG. 21E), depending on the design needs for the positions/shapes/sizes/numbers of the attraction components 3 of different electronic devices 2. In embodiments of the application, the shield pieces 30 disposed at corners of the protection filter body 10 extends directly adjacent to the side surfaces of the protection filter body 10 at both of the edges that define the corner. As shown in the figures, the attracting blocks 21 arranged at the corners may be a single embedded attracting block 21 in each corner that is smaller than the area covered by the corresponding shield piece 30 (FIG. 21A and FIG. 21C), a single foil type attracting block 21 in each corner, with a shape and size that is the same as the corresponding shield piece 30 (FIG. 21B), a plurality of embedded attracting blocks 21 configured each at the corners, having the same shape (FIG. 21D) or different shapes (FIG. 21E). Similarly, the attracting blocks at the top edge of the protection filter body 10 may comprise two foil type attracting blocks 21, with a shape and size that is the same as the corresponding shield piece 30 covered thereon (FIG. 21A), or two or more embedded attracting blocks 21, with having the same shapes (FIG. 21B, FIG. 21C and FIG. 21D), or different shapes (FIG. 21E), each smaller than the area covered by the corresponding shield piece 30. It is noted that the attracting blocks 21 and the shield pieces may be configured so that the area covered by the shield pieces 30 is narrower than illustrated in the figures. It is understood that in other embodiments of the application, shield pieces 30 and/or attracting blocks 21 may also be disposed on the rear surface 14, or may alternately be disposed on the rear surface 14 only.

In some embodiments, the attracting blocks 21 are configured at two, three or four edges of the protection filter body 10.

Figure 22C:
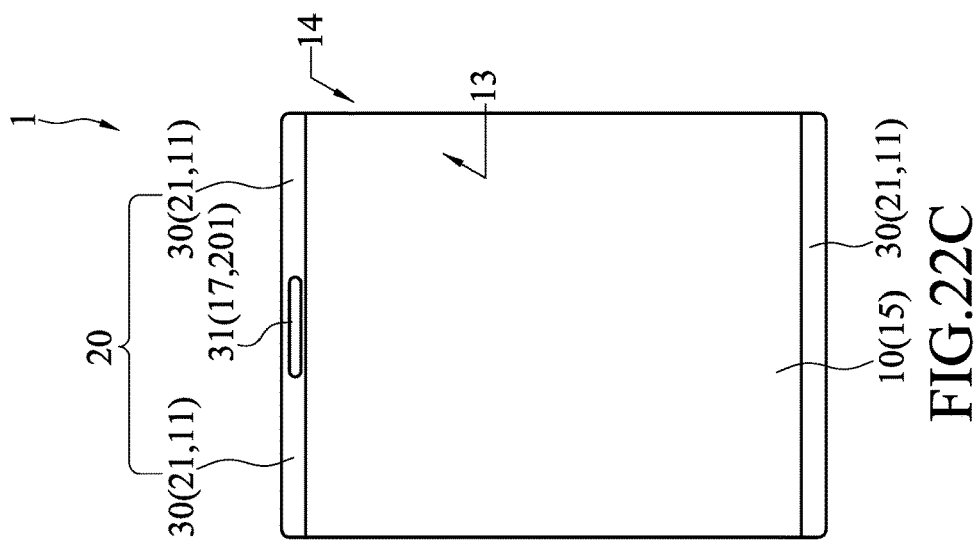
FIG. 22C is a front view of a screen protection filter according to another exemplary embodiment of the instant disclosure.
Figure 22B:
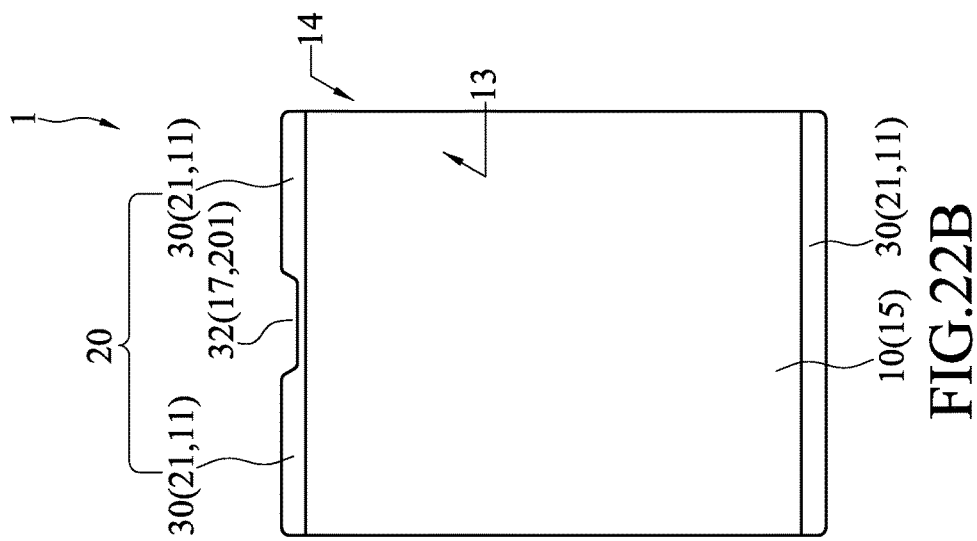
FIG. 22B is a front view of a screen protection filter according to another exemplary embodiment of the instant disclosure.
Figure 22A:
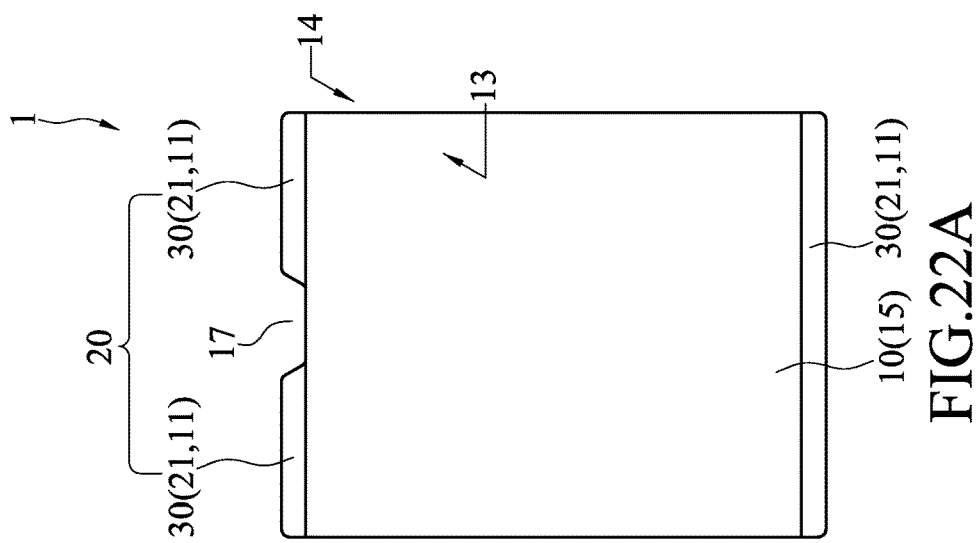
FIG. 22A is a front view of a screen protection filter according to another exemplary embodiment of the instant disclosure.

Refer to FIGS. 22A, 22B, and 22C, each of which is a front view of a screen protection filter 1 according to other exemplary embodiments of the instant disclosure. In the embodiments, shield piece(s) 30 and attracting block(s) 21 are provided at an upper widthwise edge of the protection filter body 10. In FIG. 22A, two attracting blocks 21 and two shield pieces 30 are provided extending along a widthwise edge of the protection filter body 10 leaving a gap there between corresponding to the location of opening 17 of the protection filter body 10. In FIG. 22B, a notch 32 is provided in a shield piece 30 extending along an entire widthwise edge of the protection filter body 10, the notch 32 corresponding to opening 17 of the protection filter body 10 and opening 201 of the attracting block 21. In FIG. 22C, a through hole 31 is provided in a shield piece 30 extending along an entire widthwise edge of the protection filter body 10, the through hole 31 corresponding to opening 17 of the protection filter body 10 and opening 201 of the attracting block 21. As shown in FIGS. 22A-22C, a shield piece 30 and an attracting block 21 may also be provided at a lower widthwise edge of the protection filter body 10. It is understood that in other embodiments of the application, shield pieces 30 and/or attracting blocks 21 may also be disposed on the rear surface 14, or may alternately be disposed on the rear surface 14 only. Moreover, it is understood that in other embodiments of the application, the notch 17, the gap, opening 32 or through hole 31, and opening 201 may be provided at the lower widthwise edge instead of the upper widthwise edge, or may be provided on both the upper and lower widthwise edges.

Figure 23A:
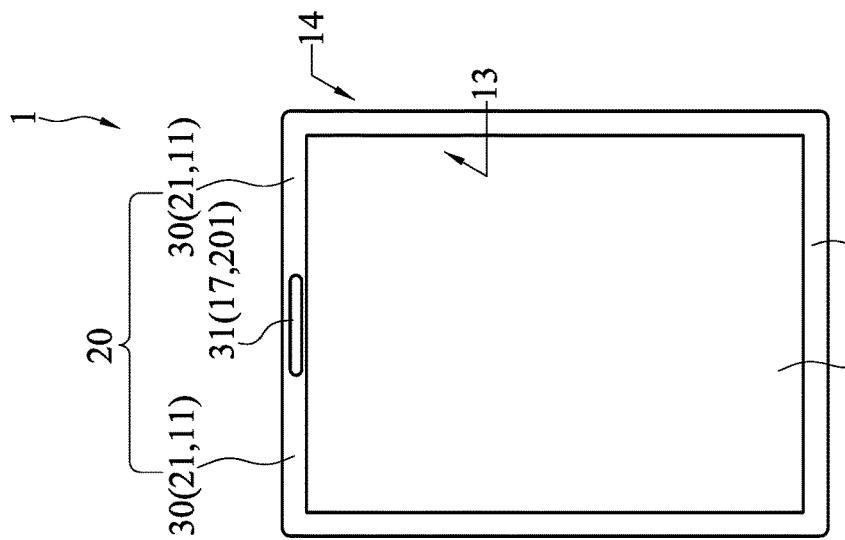
FIG. 23A is a front view of a screen protection filter according to another exemplary embodiment of the instant disclosure.
Figure 23B:
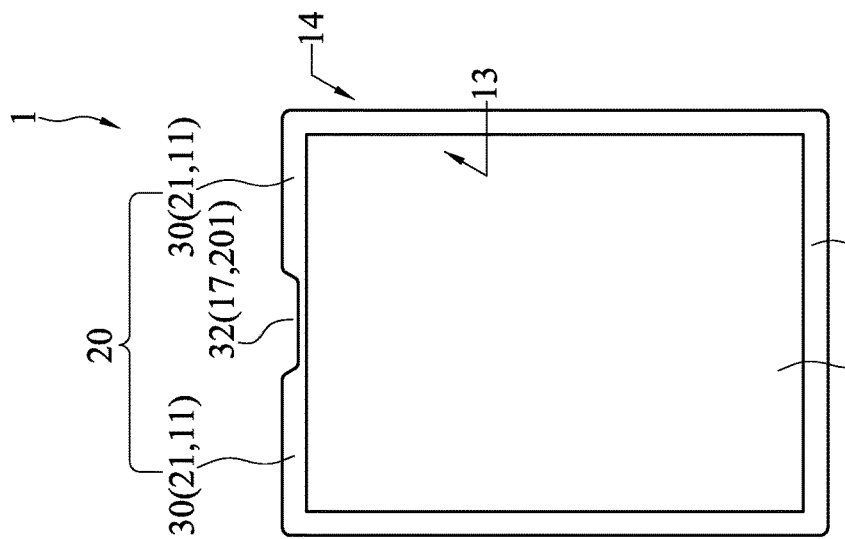
FIG. 23B is a front view of a screen protection filter according to another exemplary embodiment of the instant disclosure.
Figure 23C:
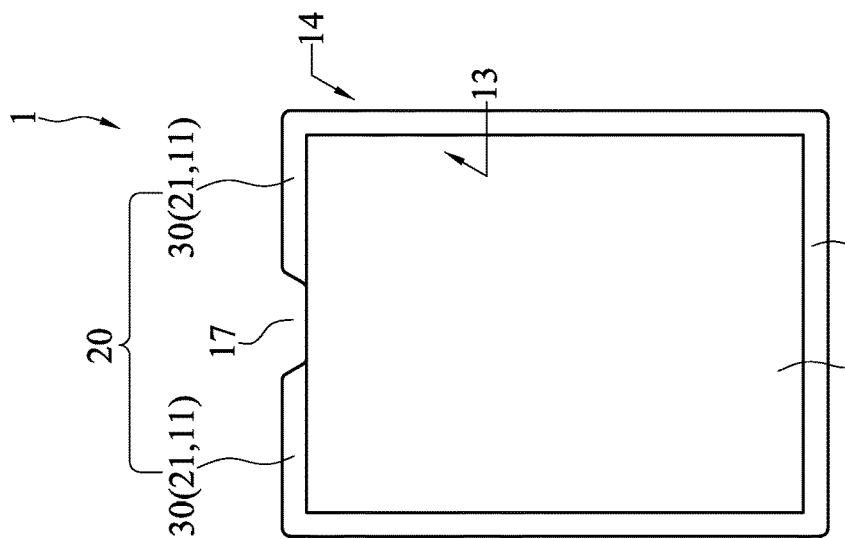
FIG. 23C is a front view of a screen protection filter according to another exemplary embodiment of the instant disclosure.

Refer to FIGS. 23A, 23B, and 23C, each of which is a front view of a screen protection filter 1 according to other exemplary embodiments of the instant disclosure. In the embodiments, a shield piece 30 and an attracting block 21 extend along all four edges of the protection filter body 10. In FIG. 23A, a discontinuity in the shield piece 30 and an attracting block 21 at the upper edge of the protection filter body 10 leaves a gap corresponding to the location of opening 17 of the protection filter body 10. In FIGS. 23B and 23C, the shield piece 30 and attracting block 21 extend along the entire lengths of all four edges of the protection filter body 10. In FIG. 23B, a notch 32 is provided in the shield piece 30 at the upper edge of the protection filter body 10, the notch 32 corresponding to opening 17 of the protection filter body 10 and opening 201 of the attracting block 21. In FIG. 23C, a through hole 31 is provided in a shield piece 30 at the upper edge of the protection filter body 10, the through hole 31 corresponding to opening 17 of the protection filter body 10 and opening 201 of the attracting block 21. It is understood that in other embodiments of the application, shield pieces 30 and/or attracting blocks 21 may also be disposed on the rear surface 14, or may alternately be disposed on the rear surface 14 only. Moreover, it is understood that in other embodiments of the application, the notch 17, the gap, opening 32 or through hole 31, and opening 201 may be provided at the lower widthwise edge instead of the upper widthwise edge, or may be provided on both the upper and lower widthwise edges.

Figure 24A:
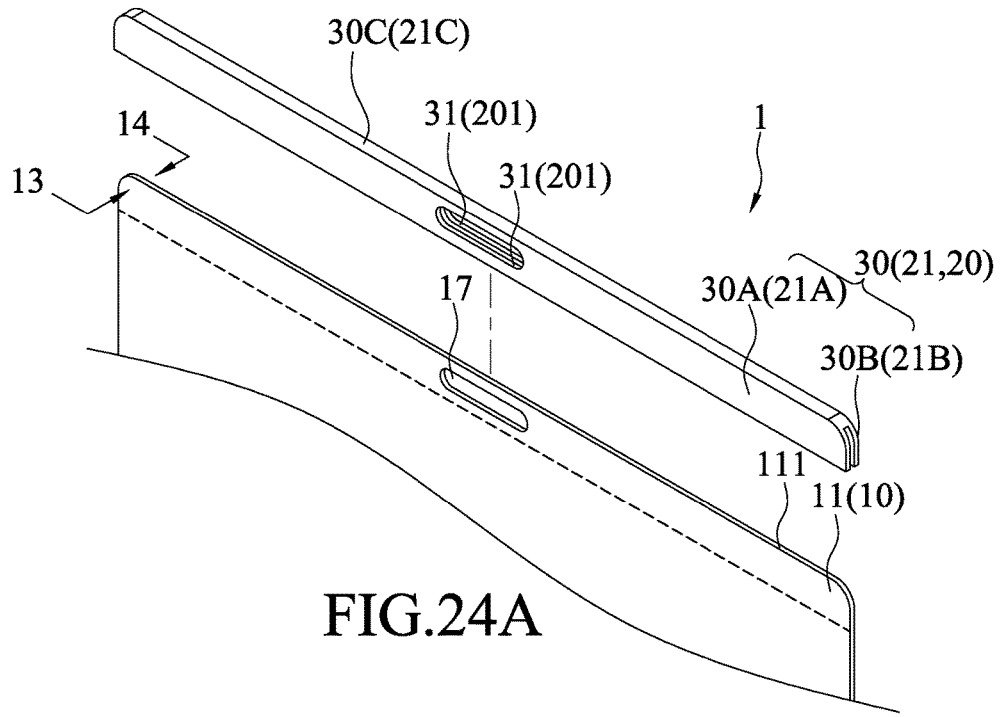
FIG. 24A is a partial exploded view of a screen protection filter according to another exemplary embodiment of the instant disclosure.
Figure 24B:
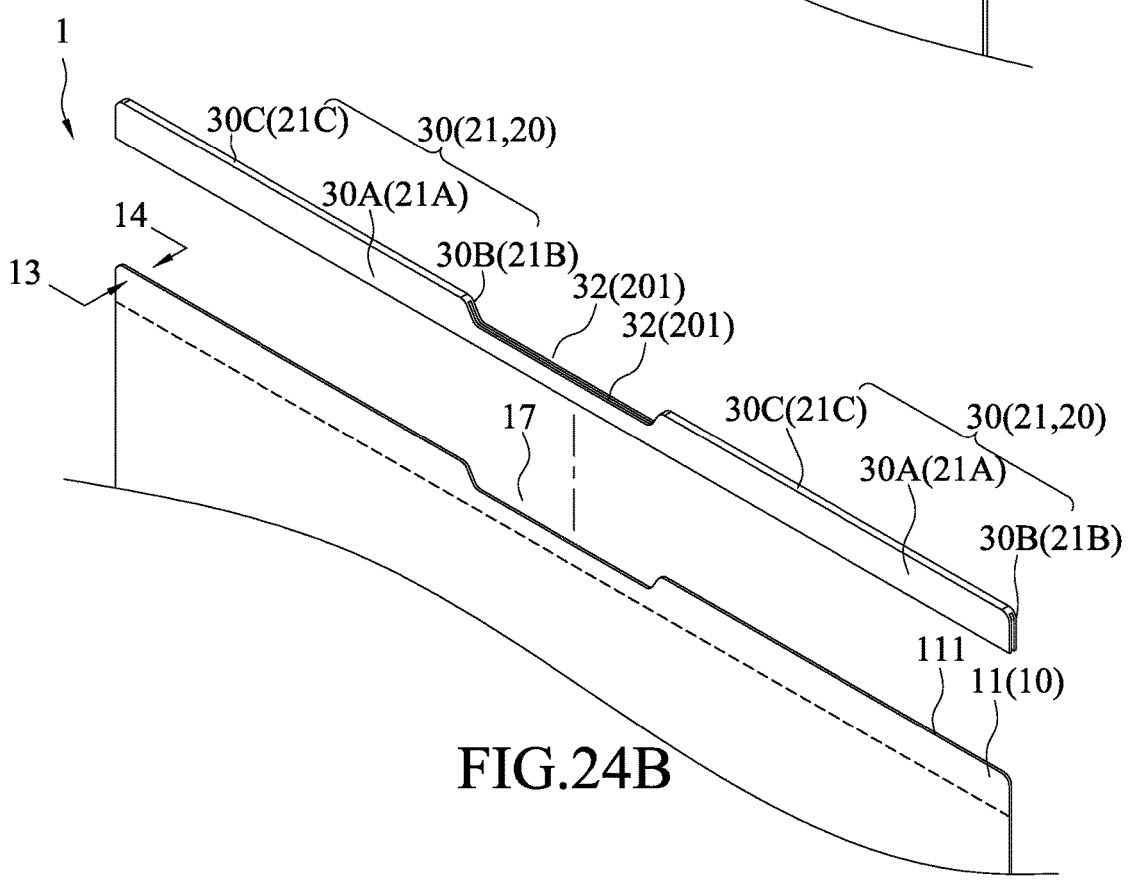
FIG. 24B is a partial exploded view of a screen protection filter according to another exemplary embodiment of the instant disclosure.

Refer to FIGS. 24A, 24B, and 24C, each of which is a partial exploded view of a screen protection filter 1 according to other exemplary embodiments of the instant disclosure. In the embodiments, shield piece(s) 30 and attracting block(s) 21 with the corresponding sizes and shapes are provided to fold over an upper edge of the protection filter body 10. In FIGS. 24A-24C, shield piece(s) 30 and attracting block(s) 21 are illustrated as a single layer because the layers are too thin to clearly illustrate the two layer structure. FIGS. 24D and 24E are provided to illustrate the two layer structure, wherein FIG. 24D is a partial sectional view of the upper side surface 111 in any one of FIGS. 24A-24C, and FIG. 24E is an enlarged view of the circled portion 5 of FIG. 24D.

In FIG. 24A, an attracting block 21 of an attracting member 20 is folded over to cover an upper edge and an upper side surface 111 of the protection filter body 10, and cover upper portions of front/rear surfaces 13/14 of the protection filter body 10 adjacent to the upper edge and the upper side surface 111. The folded attracting block 21 of the attracting member 20 has a middle portion 21C between a front portion 21A and a rear portion 21B, wherein the front/rear portions 21A/21B respectively cover portions of the upper portions of front/rear surfaces 13/14, while the middle portion 21C covers over the upper side surface 111, as shown in FIGS. 24D and 24E. Similarly, the shield piece 30, having a middle portion 30C between a front portion 30A and a rear portion 30B, is folded to respectively cover the folded attracting block 21, wherein the front/rear portions 30A/30B of the shield piece 30 respectively cover the front/rear portions 21A/21B of the folded attracting block 21, while the middle portion 30C of the shield piece 30 covers the middle portion 21C of the folded attracting block 21, as shown in FIGS. 24D and 24E. In the illustrated embodiment, both of the folded shield piece 30 and the folded attracting block 21 fold over and extend along the entire upper edge of the protection filter body 10. Moreover, in the illustrated embodiment, two through holes 31 are defined on the front/rear portions 30A/30B of the shield piece 30 and two corresponding openings 201 are defined on the front/rear portions 21A/21B of the folded attracting block 21, said through holes 31 and openings 201 corresponding to the opening 17 of the protection filter body 10 in size, shape and position.

In FIG. 24B, similarly, an attracting block 21 of an attracting member 20 is folded to cover over an upper edge and an upper side surface 111 of the protection filter body 10 so as to cover upper portions of front/rear surfaces 13/14 of the protection filter body 10 adjacent to the upper edge and the upper side surface 111. The folded attracting block 21 of the attracting member 20 has a middle portion 21C between a front portion 21A and a rear portion 21B, wherein the front/rear portions 21A/21B respectively cover portions of the upper portions of front/rear surfaces 13/14, while the middle portion 21C covers over the upper side surface 111, as shown in FIGS. 24D and 24E. The shield piece 30, having a middle portion 30C between a front portion 30A and a rear portion 30B, is folded to respectively cover the folded attracting block 21, wherein the front/rear portions 30A/30B of the shield piece 30 respectively cover the front/rear portions 21A/21B of the folded attracting block 21, while the middle portion 30C of the shield piece 30 covers the middle portion 21C of the folded attracting block 21, as shown in FIGS. 24D and 24E. In the illustrated embodiment, both of the shield piece 30 and the folded attracting block 21 fold over and extend along the entire upper edge of the protection filter body 10. Moreover, in the illustrated embodiment, two notches 32 are defined on the front/rear portions 30A/30B/30C of the shield piece 30 and two corresponding openings 201 are defined on the front/rear/middle portions 21A/21B/21C of the folded attracting block 21, said notches 32 and openings 201 corresponding to the notch 17 of the protection filter body 10, in size, shape and position.

In FIG. 24C, two attracting blocks 21 of an attracting member 20 are folded over to cover the upper edge and two separate upper side surfaces 111 of the protection filter body 10, and cover separate upper portions of front/rear surfaces 13/14 of the protection filter body 10 adjacent to the upper edge and the upper side surfaces 111. Both of two separate upper side surfaces 111 and the separate upper portions of the front/rear surfaces 13/14 are separated by a gap there between. Each of the two folded attracting blocks 21 of the attracting member 20 has a middle portion 21C between a front portion 21A and a rear portion 21B, wherein the front/rear portions 21A/21B respectively cover portions of the upper portions of front/rear surfaces 13/14, while the middle portion 21C covers over the upper side surface 111, as shown in FIGS. 24D and 24E. Each of the shield pieces 30, having a middle portion 30C between a front portion 30A and a rear portion 30B, are folded to respectively cover the folded attracting block 21, wherein the front/rear portions 30A/30B of the shield piece 30 respectively cover the front/rear portions 21A/21B of the folded attracting block 21, while the middle portion 30C of the shield piece 30 covers the middle portion 21C of the folded attracting block 21, as shown in FIGS. 24D and 24E. In the illustrated embodiment, two shield pieces 30 with the front/rear/middle portions 30A/30B/30C and the two attracting blocks 21 with the front/rear/middle portions 21A/21B/21C together fold over and together extend along the entire upper edge 111 of the protection filter body 10 except for the section defining the gap. Moreover, in the illustrated embodiment, the gap corresponds to the notch 17 of the protection filter body 10, in size, shape and position.

Moreover, it is understood that in other embodiments of the application, folded attracting blocks 21 covering over the edge of the protection filter body 10 as illustrated in FIGS. 24A-24E, with or without corresponding folded shield pieces 30 covering on the attracting blocks 21, may be disposed at one or more corners of the protection filter body 10 defined by two other adjacent edges thereof.

Accordingly, the above-mentioned embodiments disclose various screen protection filter(s) provided with an attracting member disposed at an attraction area of its protection filter body. In the installing process, the attracting member may be simply aligned with attraction component(s) of an electronic device to rapidly attach the screen protection filter to the electronic device and cover a display screen thereof, thereby preventing nearby persons from spying display contents and keeping privacy. By simply attaching the attracting member to the attraction component and removing therefrom, the screen protection filter can be easily attached to and removed from the display screen of the electronic device whenever needed.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A screen protection filter, comprising:
   a protection filter body, configured to reduce a viewing angle of light transmitted therethrough, wherein the protection filter body comprises an attraction area and a protection area;
   an attracting member comprising a first attracting block, the first attracting block disposed in the attracting area and extending along the first lengthwise edge and having an opening configured to prevent a functional component adjacent to a display screen of an electronic device from being covered by the first attracting block while the screen protection filter is attached to the display screen, and
   a shield piece disposed in the attracting area and configured to cover an outer portion of the attracting member and fold over the first lengthwise edge, wherein the shield piece comprises a through hole corresponding to the opening of the first attracting block.

2. The screen protection filter according to claim 1, wherein the first attracting block is folded over the first lengthwise edge of the protection filter body.

3. The screen protection filter according to claim 1, wherein the protection filter body comprises an opening corresponding to the opening of the first attracting block and the opening of the shield piece, and wherein the first attracting block is arranged between the shield piece and the protection filter body.

4. The screen protection filter according to claim 1, wherein the attracting member further comprises a second attracting block extending along a second lengthwise edge of the protection filter body opposite to the first lengthwise edge.

5. The screen protection filter according to claim 1, wherein the attracting member further comprises a second attracting block and a third attracting block respectively extending along two other edges of the protection filter body.

6. The screen protection filter according to claim 1, wherein the first attracting block extends along all other edges of the protection filter body.

7. The screen protection filter according to claim 1, wherein the protection filter body comprises an outer surface layer disposed over a grating layer.

8. The screen protection filter according to claim 1, wherein the first attracting block is positioned in an accommodation hole of the protection filter body.

9. A screen protection filter, comprising:
 a protection filter body, configured to reduce a viewing angle of light transmitted therethrough, wherein the protection filter body comprises an attraction area and a protection area;
 an attracting member comprising a first attracting block, the first attracting block disposed in the attracting area and extending along the first lengthwise edge of the protection filter body and having an opening configured to prevent a functional component adjacent to a display screen of an electronic device from being covered by the first attracting block while the screen protection filter is attached to the display screen; and
 a shield piece, wherein the shield piece is disposed in the attracting area and configured to cover an outer portion of the attracting member and fold over the first lengthwise edge, and the shield piece comprises a through hole corresponding to the opening of the first attracting block, and the protection filter body comprises an opening corresponding to the opening of the first attracting block and the opening of the shield piece, and wherein the first attracting block is arranged between the shield piece and the protection filter body.

10. The screen protection filter according to claim 9, wherein the opening of the first attracting block is a notch formed in a side surface of a lengthwise edge of the first attracting block.

11. The screen protection filter according to claim 9, wherein the first attracting block is folded over the first lengthwise edge of the protection filter body.

12. The screen protection filter according to claim 9, wherein the attracting member further comprises a second attracting block extending along a second lengthwise edge of the protection filter body opposite to the first lengthwise edge.

13. The screen protection filter according to claim 9, wherein the attracting member further comprises a second attracting block and a third attracting block respectively extending along two other edges of the protection filter body.

14. The screen protection filter according to claim 9, wherein the first attracting block extends along all other edges of the protection filter body.

15. The screen protection filter according to claim 9, wherein the protection filter body comprises an outer surface layer disposed over a grating layer.

16. The screen protection filter according to claim 9, wherein the first attracting block is positioned in an accommodation hole of the protection filter body.

17. A screen protection filter, comprising:
 a protection filter body, configured to reduce a viewing angle of light transmitted therethrough, wherein the protection filter body comprises an attraction area and a protection;
 a first attracting block extending along the entire first edge of the protection filter body; and
 a shield piece, disposed in the attracting area and configured to cover an outer portion of the first attracting block and fold over the first lengthwise edge to protect an electronic device while the screen protection filter is attached to a display screen of the electronic device, wherein the first attracting block is arranged between the shield piece and the protection filter body.

18. The screen protection filter according to claim 17, wherein the first attracting block comprises an opening configured to prevent a functional component of the electronic device adjacent to the display screen from being covered while the screen protection filter is attached to the display screen.

19. The screen protection filter according to claim 18, wherein the opening of the first attracting block is a notch in a side surface of a lengthwise edge of the first attracting block.

20. The screen protection filter according to claim 18, wherein the shield piece comprises a through hole corresponding to the opening of the first attracting block, and the protection filter body comprises an opening corresponding to the opening of the first attracting block and the opening of the shield piece.

21. The screen protection filter according to claim 17, further comprising a second attracting block extending along a second edge of the protection filter body opposite or adjacent to the first edge.

22. The screen protection filter according to claim 17, wherein the first attracting block is folded over the first edge.

23. The screen protection filter according to claim 17, wherein the first edge is a lengthwise edge or a widthwise edge.

24. The screen protection filter according to claim 17, wherein the first attracting block is positioned in an accommodation hole of the protection filter body.

25. A screen protection filter for use with a display screen of an electronic device having one or more attracting components, comprising:
 a protection filter body, configured to reduce a viewing angle of light transmitted therethrough, wherein the protection filter body comprises an attraction area and a protection area; an attracting member comprising a first attracting block, the first attracting block extending along the first lengthwise edge of the protection filter body and having an opening configured to prevent a functional component adjacent to a display screen of an electronic device from being covered by the first attracting block while the screen protection filter is attached to the display screen, wherein the screen protection filter is removably attached to the display screen by an attractive force between the attracting member and the one or more attracting components only; and a shield piece, wherein the shield piece is disposed in the attracting area and configured to cover an outer portion of the attracting member and fold over the first lengthwise edge.

26. The screen protection filter according to claim 25, wherein the protection filter body comprises an outer surface layer disposed over a grating layer.

27. The screen protection filter according to claim 25, wherein the opening of the first attracting block is a notch formed in a side surface of a lengthwise edge of the first attracting block.

28. The screen protection filter according to claim 25, wherein the first attracting block is positioned in an accommodation hole of the protection filter body.

29. A screen protection filter, comprising:
a protection filter body, configured to reduce a viewing angle of light transmitted therethrough; and
an attracting member comprising a first attracting block, the first attracting block extending along a first lengthwise edge of the protection filter body and having an opening configured to prevent a functional component adjacent to a display screen of an electronic device from being covered by the first attracting block while the screen protection filter is attached to the display screen, wherein the opening of the first attracting block is a notch formed in a side surface of a lengthwise edge of the first attracting block;
a shield piece, wherein the shield piece is configured to cover an outer portion of the attracting member, wherein the first attracting block is folded over the first lengthwise edge of the protection filter body, and the shield piece is folded over the attracting block, such that the first attracting block is between the protection filter body and the shield piece.

30. A screen protection filter, comprising:
a protection filter body, configured to reduce a viewing angle of light transmitted therethrough; and
an attracting member comprising a first attracting block and a second attracting block, the first attracting block extending along a first lengthwise edge of the protection filter body and having an opening configured to prevent a functional component adjacent to a display screen of an electronic device from being covered by the first attracting block while the screen protection filter is attached to the display screen, wherein the opening of the first attracting block is a notch formed in a side surface of a lengthwise edge of the first attracting block, the first attracting block is disposed on a front surface of the protection filter body and the second attracting block is disposed on a rear surface of the protection filter body;
a first shield piece disposed on the first attracting block; and
a second shield piece the second shield piece is disposed on the second attracting block, such that the first attracting block is between the front surface of the protection filter body and the first shield piece, the second attracting block is between the rear surface of the protection filter body and the second shield piece, and a side surface of the protection filter body is exposed.

31. A screen protection filter, comprising:
a protection filter body, configured to reduce a viewing angle of light transmitted therethrough;
an attracting member comprising a first attracting block, the first attracting block extending along a first lengthwise edge of the protection filter body and having an opening configured to prevent a functional component adjacent to a display screen of an electronic device from being covered by the first attracting block while the screen protection filter is attached to the display screen; and
a shield piece, wherein the shield piece is configured to cover an outer portion of the attracting member, and the shield piece comprises a through hole corresponding to the opening of the first attracting block, and the protection filter body comprises an opening corresponding to the opening of the first attracting block and the opening of the shield piece, and wherein the first attracting block is arranged between the shield piece and the protection filter body, the first attracting block is folded over the first lengthwise edge of the protection filter body, and the shield piece is folded over the attracting block.

32. A screen protection filter, comprising:
a protection filter body, configured to reduce a viewing angle of light transmitted therethrough;
a first attracting block extending along an entire first edge of the protection filter body; and
a shield piece, configured to cover an outer portion of the first attracting block to protect an electronic device while the screen protection filter is attached to a display screen of the electronic device, wherein the first attracting block is arranged between the shield piece and the protection filter body, wherein the first attracting block is folded over the first lengthwise edge of the protection filter body, and the shield piece is folded over the attracting block.

33. A screen protection filter for use with a display screen of an electronic device having one or more attracting components, comprising:
a protection filter body, configured to reduce a viewing angle of light transmitted therethrough; and
an attracting member comprising a first attracting block, the first attracting block extending along a first lengthwise edge of the protection filter body and having an opening configured to prevent a functional component adjacent to a display screen of an electronic device from being covered by the first attracting block while the screen protection filter is attached to the display screen, wherein the screen protection filter is removably attached to the display screen by an attractive force between the attracting member and the one or more attracting components only;
a shield piece, wherein the shield piece is configured to cover an outer portion of the attracting member, wherein the first attracting block is folded over the first lengthwise edge of the protection filter body, and the shield piece is folded over the attracting block, such that the first attracting block is between the protection filter body and the shield piece.

34. A screen protection filter for use with a display screen of an electronic device having one or more attracting components, comprising:
a protection filter body, configured to reduce a viewing angle of light transmitted therethrough; and
an attracting member comprising a first attracting block, the first attracting block extending along a first lengthwise edge of the protection filter body and having an opening configured to prevent a functional component adjacent to a display screen of an electronic device from being covered by the first attracting block while the screen protection filter is attached to the display screen, wherein the screen protection filter is removably attached to the display screen by an attractive force between the attracting member and the one or more attracting components only;

a second attracting block, a first shield piece and a second shield piece, wherein the first attracting block is disposed on a front surface of the protection filter body, the first shield piece is disposed on the first attracting block, the second attracting block is disposed on a rear surface of the protection filter body, and the second shield piece is disposed on the second attracting block, such that the first attracting block is between the front surface of the protection filter body and the first shield piece, the second attracting block is between the rear surface of the protection filter body and the second shield piece, and a side surface of the protection filter body is exposed.

* * * * *